United States Patent
Kanamarlapudi et al.

(10) Patent No.: US 12,500,726 B2
(45) Date of Patent: Dec. 16, 2025

(54) PACKET DATA CONVERGENCE PROTOCOL HANDLING FOR SECONDARY CELL GROUP DEACTIVATION

(71) Applicant: QUALCOMM Incorporated, San Diego, CA (US)

(72) Inventors: Sitaramanjaneyulu Kanamarlapudi, San Diego, CA (US); Punyaslok Purkayastha, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 327 days.

(21) Appl. No.: 17/447,777

(22) Filed: Sep. 15, 2021

(65) Prior Publication Data

US 2023/0079972 A1    Mar. 16, 2023

(51) Int. Cl.
*H04L 5/00* (2006.01)
*H04W 76/34* (2018.01)
*H04W 76/38* (2018.01)

(52) U.S. Cl.
CPC .......... *H04L 5/0098* (2013.01); *H04W 76/34* (2018.02); *H04W 76/38* (2018.02)

(58) Field of Classification Search
CPC ..... H04W 76/15; H04W 76/34; H04W 76/38; H04L 5/0091; H04L 5/0096; H04L 5/0098

See application file for complete search history.

(56) References Cited

U.S. PATENT DOCUMENTS

| | | | |
|---|---|---|---|
| 10,700,845 B2* | 6/2020 | Dinan | H04W 72/21 |
| 2015/0271726 A1* | 9/2015 | Kim | H04W 36/00692 |
| | | | 370/329 |
| 2016/0044744 A1* | 2/2016 | Lee | H04W 76/34 |
| | | | 370/329 |
| 2018/0324641 A1* | 11/2018 | Tsai | H04W 28/065 |
| 2018/0376457 A1* | 12/2018 | Tseng | H04L 1/16 |
| 2021/0282050 A1* | 9/2021 | Adjakple | H04L 1/1874 |
| 2022/0141904 A1* | 5/2022 | Yilmaz | H04W 76/20 |
| | | | 370/329 |

(Continued)

FOREIGN PATENT DOCUMENTS

| | | | | |
|---|---|---|---|---|
| EP | 3713357 A1 * | 9/2020 | | H04L 5/0098 |
| WO | WO-2015174658 A1 * | 11/2015 | | H04L 47/30 |

(Continued)

OTHER PUBLICATIONS

Fan Q., Data Transmission Processing Method and Related Apparatus, Jun. 16, 2022, WIPO, WO 2022/120744 A1 (Year: 2022).*

(Continued)

*Primary Examiner* — Peter Chen
*Assistant Examiner* — Jia Hao Deng
(74) *Attorney, Agent, or Firm* — Harrity & Harrity, LLP

(57) ABSTRACT

Various aspects of the present disclosure generally relate to wireless communication. In some aspects, a user equipment (UE) may receive, from a base station, a secondary cell group (SCG) deactivation command indicating that an SCG associated with the UE is deactivated. The UE may perform an action associated with a packet data convergence protocol (PDCP) entity and a split radio bearer associated with the SCG based at least in part on receiving the SCG deactivation command. Numerous other aspects are described.

30 Claims, 11 Drawing Sheets

(56) References Cited

U.S. PATENT DOCUMENTS

2022/0225453 A1* 7/2022 Kim .................. H04W 76/20

FOREIGN PATENT DOCUMENTS

WO     WO-2021026930 A1 *    2/2021   .......... H04L 5/0053
WO     WO-2022120744 A1 *    6/2022   ............ H04W 24/04

OTHER PUBLICATIONS

International Search Report and Written Opinion—PCT/US2022/074229—ISA/EPO—Nov. 18, 2022.
Samsung: "Bearer Handling for SCG Deactivation", 3GPP TSG RAN WG2 Meeting #115, R2-2107669, 3rd Generation Partnership Project, Mobile Competence Centre, 650, Route Des Lucioles, F-06921 Sophia-Antipolis Cedex, France, vol. RAN WG2, No. e-Meeting, Aug. 16, 2021-Aug. 27, 2021 Aug. 5, 2021, XP052032353, 3 Pages, Section 2.2.

* cited by examiner

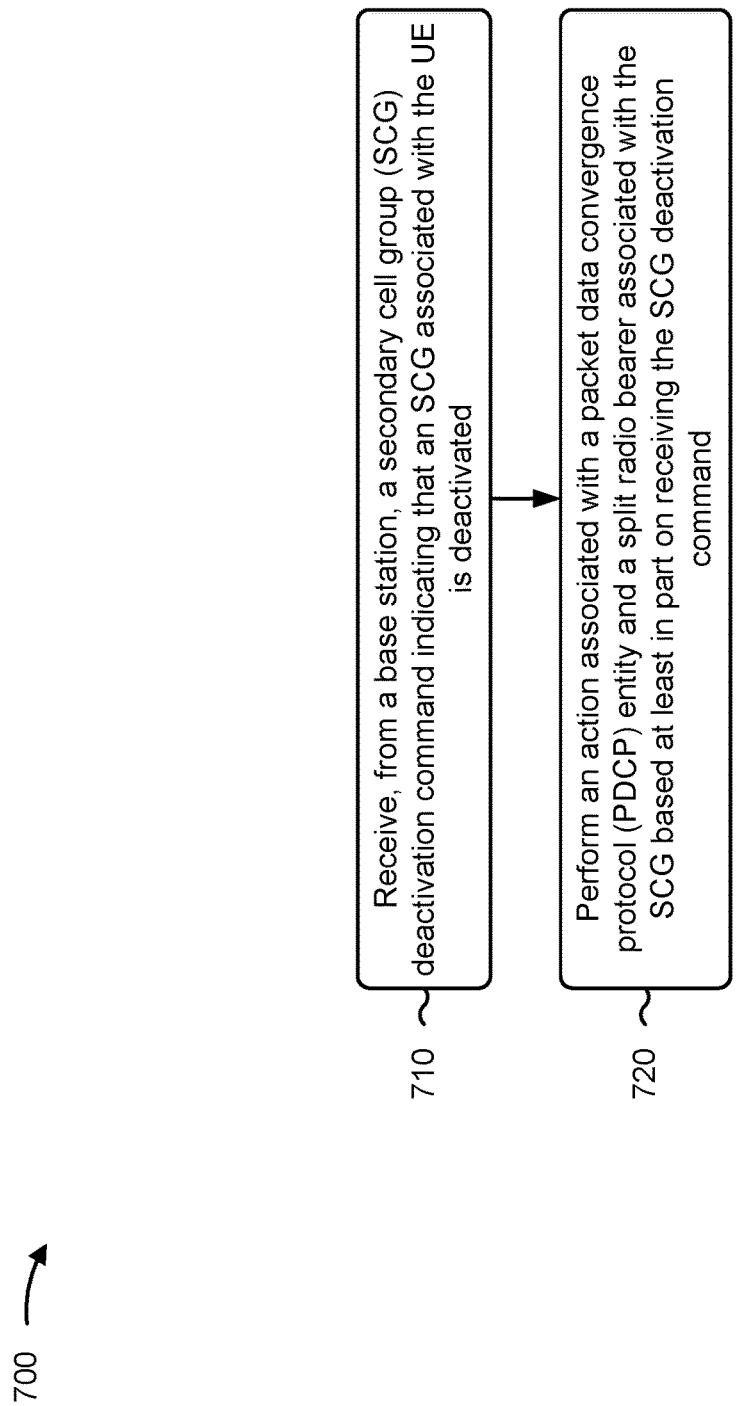

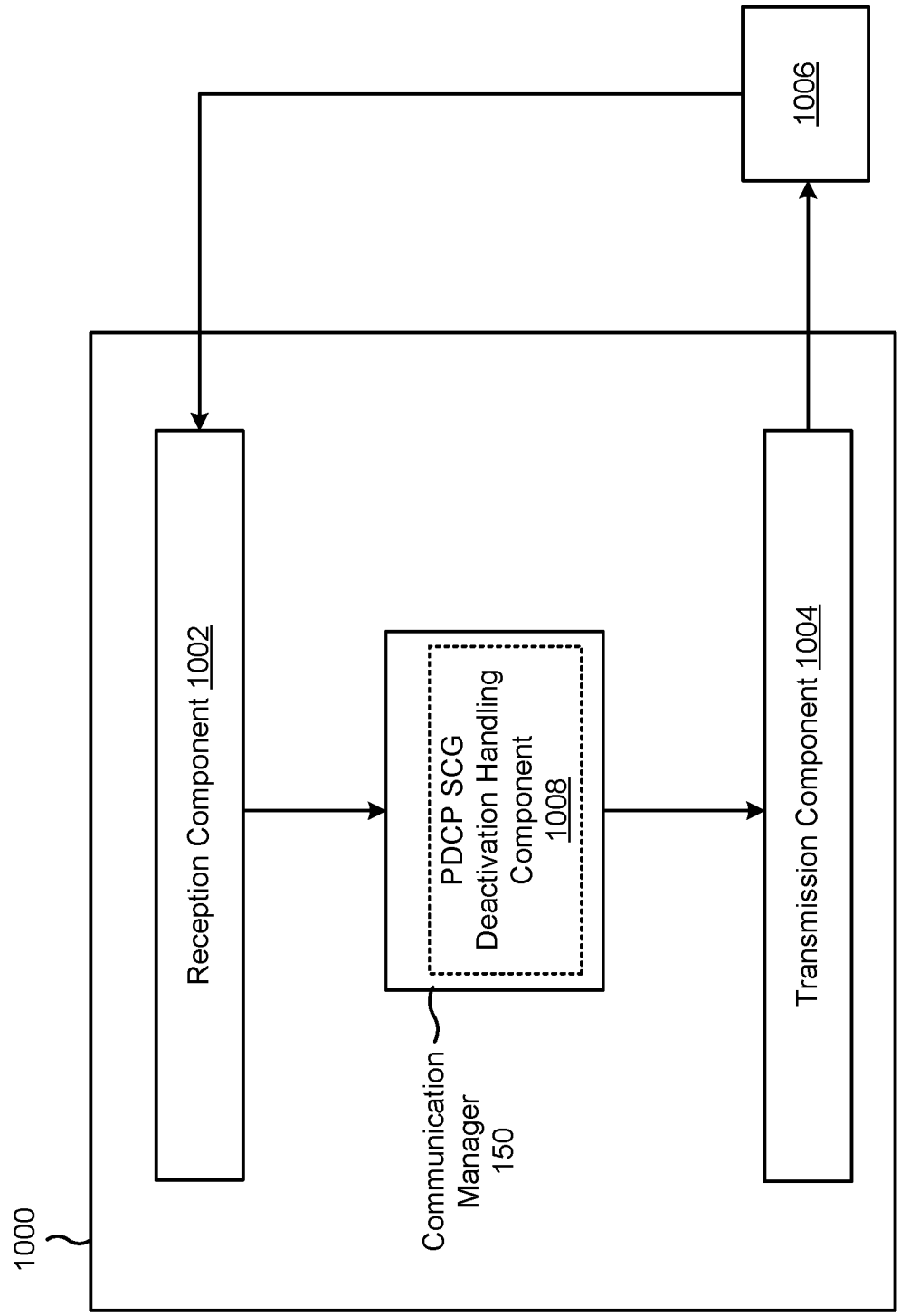

US 12,500,726 B2

PACKET DATA CONVERGENCE PROTOCOL HANDLING FOR SECONDARY CELL GROUP DEACTIVATION

FIELD OF THE DISCLOSURE

Aspects of the present disclosure generally relate to wireless communication and to techniques and apparatuses for packet data convergence protocol (PDCP) handling for secondary cell group (SCG) deactivation.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to an apparatus for wireless communication at a user equipment (UE). The apparatus may include a memory and one or more processors coupled to the memory. The one or more processors may be configured to receive, from a base station, a secondary cell group (SCG) deactivation command indicating that an SCG associated with the UE is deactivated. The one or more processors may be configured to perform an action associated with a packet data convergence protocol (PDCP) entity and a split radio bearer associated with the SCG based at least in part on receiving the SCG deactivation command.

Some aspects described herein relate to a method of wireless communication performed by a UE. The method may include receiving, from a base station, an SCG deactivation command indicating that an SCG associated with the UE is deactivated. The method may include performing an action associated with a PDCP entity and a split radio bearer associated with the SCG based at least in part on receiving the SCG deactivation command.

Some aspects described herein relate to a non-transitory computer-readable medium that stores a set of instructions for wireless communication by a UE. The set of instructions, when executed by one or more processors of the UE, may cause the UE to receive, from a base station, an SCG deactivation command indicating that an SCG associated with the UE is deactivated. The set of instructions, when executed by one or more processors of the UE, may cause the UE to perform an action associated with a PDCP entity and a split radio bearer associated with the SCG based at least in part on receiving the SCG deactivation command.

Some aspects described herein relate to an apparatus for wireless communication. The apparatus may include means for receiving, from a base station, an SCG deactivation command indicating that an SCG associated with the apparatus is deactivated. The apparatus may include means for performing an action associated with a packet data convergence protocol (PDCP) entity and a split radio bearer associated with the SCG based at least in part on receiving the SCG deactivation command.

Some aspects described herein relate to apparatus for wireless communication at a base station. The apparatus may include a memory and one or more processors coupled to the memory. The one or more processors may be configured to transmit, to a UE, an SCG deactivation command indicating that an SCG associated with the UE is deactivated. The one or more processors may be configured to perform an action associated with a PDCP entity and a split radio bearer associated with the SCG based at least in part on transmitting the SCG deactivation command.

Some aspects described herein relate to a method of wireless communication performed by a base station. The method may include transmitting, to a UE, an SCG deactivation command indicating that an SCG associated with the UE is deactivated. The method may include performing an action associated with a PDCP entity and a split radio bearer associated with the SCG based at least in part on transmitting the SCG deactivation command.

Some aspects described herein relate to a non-transitory computer-readable medium that stores a set of instructions for wireless communication by a base station. The set of instructions, when executed by one or more processors of the base station, may cause the base station to transmit, to a UE, an SCG deactivation command indicating that an SCG associated with the UE is deactivated. The set of instructions, when executed by one or more processors of the base station, may cause the base station to perform an action associated with a packet data convergence protocol (PDCP) entity and a split radio bearer associated with the SCG based at least in part on transmitting the SCG deactivation command.

Some aspects described herein relate to an apparatus for wireless communication. The apparatus may include means for transmitting, to a UE, an SCG deactivation command indicating that an SCG associated with the UE is deactivated. The apparatus may include means for performing an action associated with a PDCP entity and a split radio bearer associated with the SCG based at least in part on transmitting the SCG deactivation command.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIGS. 7 and 8 are diagrams illustrating example processes associated with PDCP handling for SCG deactivation, in accordance with the present disclosure.

FIGS. 9 and 10 are diagrams of example apparatuses for wireless communication, in accordance with the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
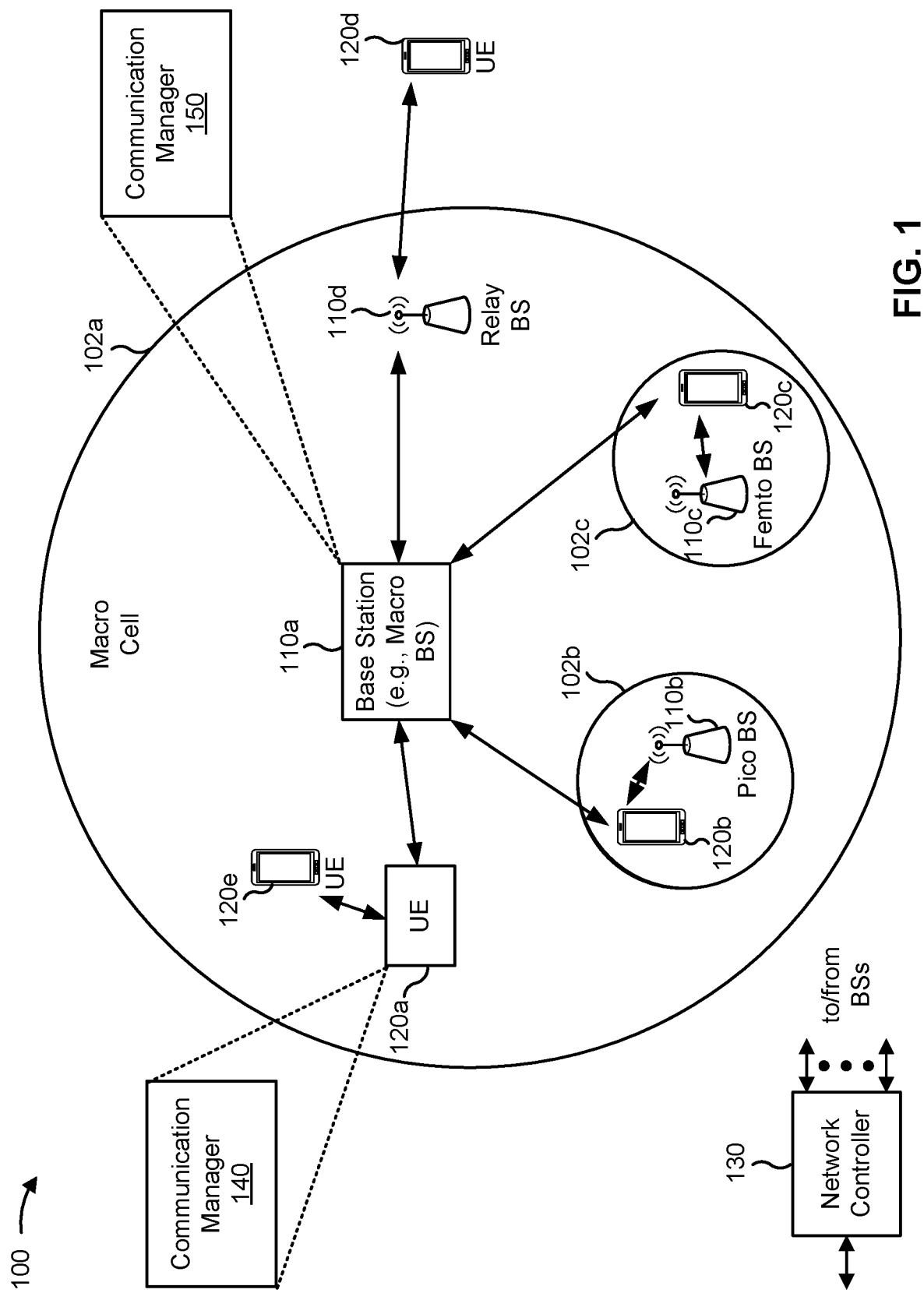
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may receive, from a base station, a secondary cell group (SCG) deactivation command indicating that an SCG associated with the UE is deactivated; and perform an action associated with a packet data convergence protocol (PDCP) entity and a split radio bearer associated with the SCG based at least in part on receiving the SCG deactivation command. Additionally, or alternatively, the communication manager 140 may perform one or more other operations described herein.

In some aspects, the base station 110 may include a communication manager 150. As described in more detail elsewhere herein, the communication manager 150 may transmit, to a UE 120, an SCG deactivation command indicating that an SCG associated with the UE is deactivated; and perform an action associated with a PDCP entity and a split radio bearer associated with the SCG based at least in part on transmitting the SCG deactivation command. Additionally, or alternatively, the communication manager 150 may perform one or more other operations described herein.

As indicated above, FIG. 1 is provided as an example. Other examples may differ from what is described with regard to FIG. 1.

Figure 2:
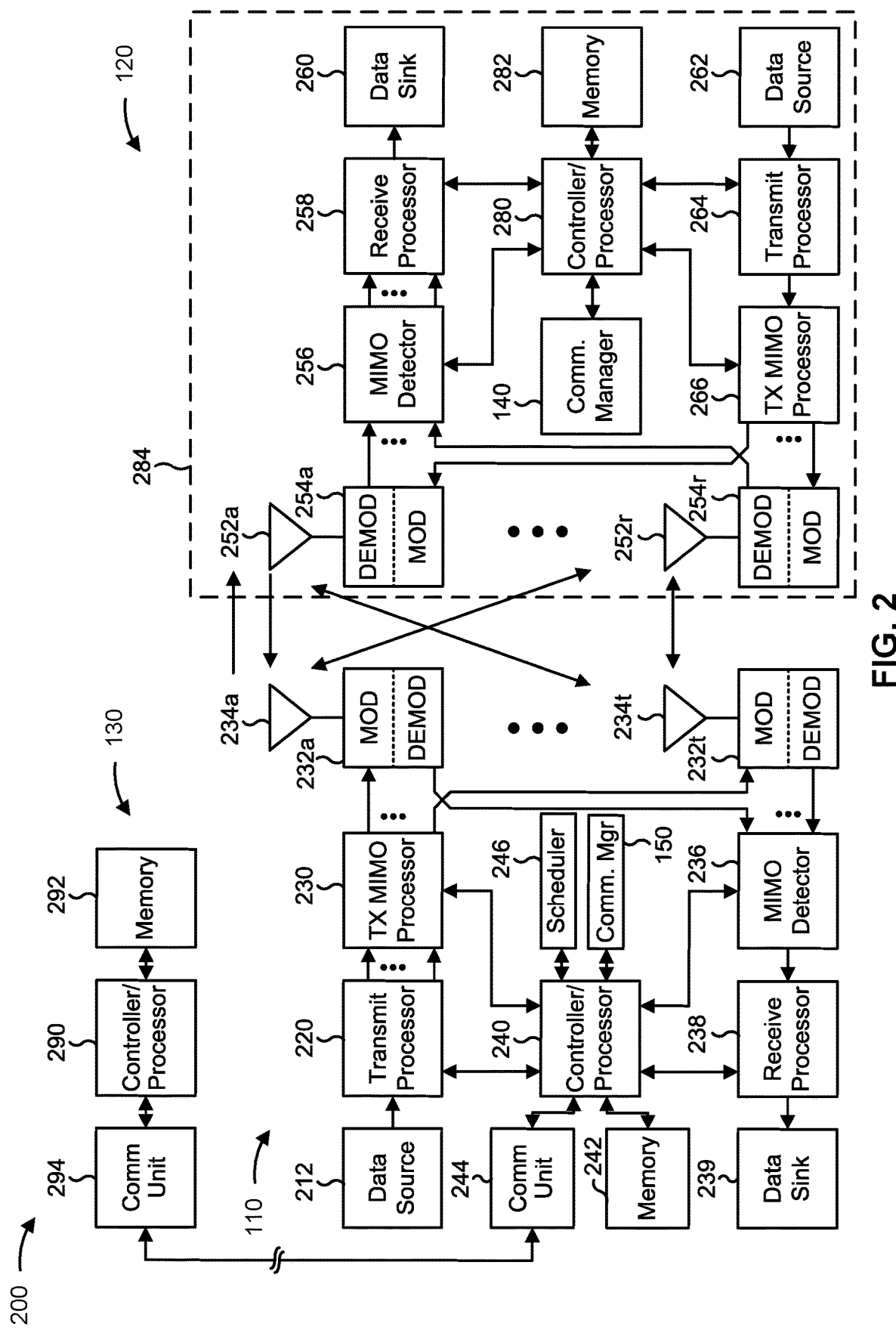
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 6A, 6B, 7, 8, 9 and 10).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 6A, 6B, 7, 8, 9 and 10).

The controller/processor 240 of the base station 110, the controller/processor 280 of the UE 120, and/or any other component(s) of FIG. 2 may perform one or more techniques associated with PDCP handling for SCG deactivation, as described in more detail elsewhere herein. For example, the controller/processor 240 of the base station 110, the controller/processor 280 of the UE 120, and/or any other component(s) of FIG. 2 may perform or direct operations of, for example, process 700 of FIG. 7, process 800 of FIG. 8, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 700 of FIG. 7, process 800 of FIG. 8, and/or other processes as described herein. In some examples, executing instructions may include running the instructions, converting the instructions, compiling the instructions, and/or interpreting the instructions, among other examples.

In some aspects, the UE 120 includes means for receiving, from a base station, an SCG deactivation command indicating that an SCG associated with the UE is deactivated; and/or means for performing an action associated with a PDCP entity and a split radio bearer associated with the SCG based at least in part on receiving the SCG deactivation command. The means for the UE 120 to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the base station 110 includes means for transmitting, to a UE, an SCG deactivation command indicating that an SCG associated with the UE is deactivated; and/or means for performing an action associated with a PDCP entity and a split radio bearer associated with the SCG based at least in part on transmitting the SCG deactivation command. The means for the base station 110 to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
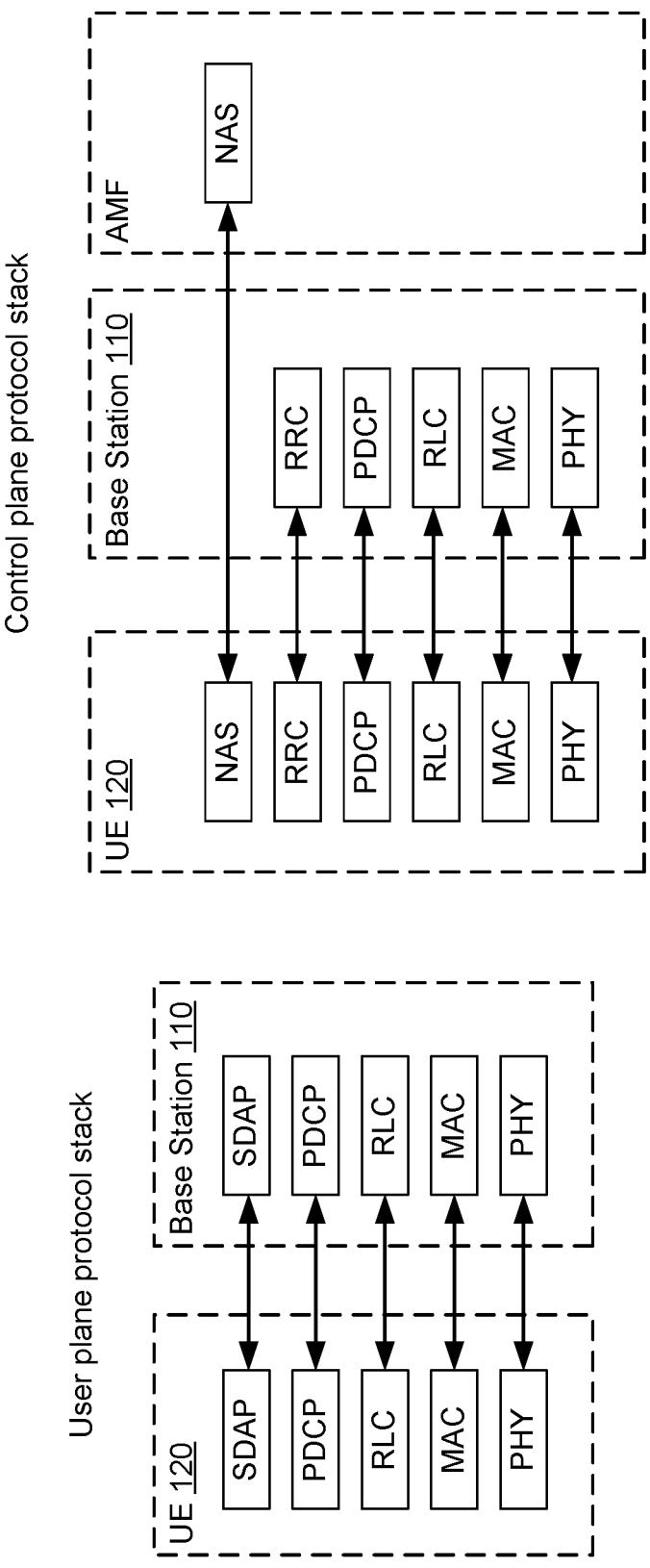
FIG. 3 is a diagram illustrating an example of a user plane protocol stack and a control plane protocol stack for a base station and a core network in communication with a UE, in accordance with the present disclosure.

FIG. 3 is a diagram illustrating an example 300 of a user plane protocol stack and a control plane protocol stack for a base station 110 and a core network in communication with a UE 120, in accordance with the present disclosure.

On the user plane, the UE 120 and the BS 110 may include respective physical (PHY) layers, medium access control (MAC) layers, radio link control (RLC) layers, PDCP layers, and service data adaptation protocol (SDAP) layers. "Layer" may be used interchangeably with "entity" herein (e.g., a PDCP layer may be referred to as a PDCP entity). A user plane function may handle transport of user data between the UE 120 and the BS 110. On the control plane, the UE 120 and the BS 110 may include respective radio resource control (RRC) layers. Furthermore, the UE 120 may include a non-access stratum (NAS) layer in communication with an NAS layer of an access and management mobility function (AMF). The AMF may be associated with a core network associated with the BS 110, such as a 5G core network (5GC) or a next-generation radio access network (NG-RAN). A control plane function may handle transport of control information between the UE and the core network. Generally, a first layer is referred to as higher than a second layer if the first layer is further from the PHY layer than the second layer. For example, the PHY layer may be referred to as a lowest layer, and the SDAP/PDCP/RLC/MAC layer may be referred to as higher than the PHY layer and lower than the RRC layer. An application (APP) layer, not shown in FIG. 3, may be higher than the SDAP/PDCP/RLC/MAC layer. In some cases, an entity may handle the services and functions of a given layer (e.g., a PDCP entity may handle the services and functions of the PDCP layer), though the description herein refers to the layers themselves as handling the services and functions.

The RRC layer may handle communications related to configuring and operating the UE 120, such as: broadcast of system information related to the access stratum (AS) and the NAS; paging initiated by the 5GC or the NG-RAN; establishment, maintenance, and release of an RRC connection between the UE and the NG-RAN, including addition, modification, and release of carrier aggregation, as well as addition, modification, and release of dual connectivity; security functions including key management; establishment, configuration, maintenance, and release of signaling radio bearers (SRBs) and data radio bearers (DRBs); mobility functions (e.g., handover and context transfer, UE cell selection and reselection and control of cell selection and reselection, inter-RAT mobility); quality of service (QoS) management functions; UE measurement reporting and control of the reporting; detection of and recovery from radio link failure; and NAS message transfer between the NAS layer and the lower layers of the UE 120. The RRC layer is frequently referred to as Layer 3 (L3).

The SDAP layer, PDCP layer, RLC layer, and MAC layer may be collectively referred to as Layer 2 (L2). Thus, in some cases, the SDAP, PDCP, RLC, and MAC layers are referred to as sublayers of Layer 2. On the transmitting side (e.g., if the UE 120 is transmitting an uplink communication or the BS 110 is transmitting a downlink communication), the SDAP layer may receive a data flow in the form of a QoS flow. A QoS flow is associated with a QoS identifier, which identifies a QoS parameter associated with the QoS flow, and a QoS flow identifier (QFI), which identifies the QoS flow. Policy and charging parameters are enforced at the QoS flow granularity. A QoS flow can include one or more service data flows (SDFs), so long as each SDF of a QoS flow is associated with the same policy and charging parameters. In some aspects, the RRC/NAS layer may generate control information to be transmitted and may map the control information to one or more radio bearers for provision to the PDCP layer.

The SDAP layer, or the RRC/NAS layer, may map QoS flows or control information to radio bearers. Thus, the SDAP layer may be said to handle QoS flows on the transmitting side. The SDAP layer may provide the QoS flows to the PDCP layer via the corresponding radio bearers. The PDCP layer may map radio bearers to RLC channels. The PDCP layer may handle various services and functions on the user plane, including sequence numbering, header compression and decompression (if robust header compression is enabled), transfer of user data, reordering and duplicate detection (if in-order delivery to layers above the PDCP layer is required), PDCP protocol data unit (PDU) routing (in case of split bearers), retransmission of PDCP service data units (SDUs), ciphering and deciphering, PDCP SDU discard (e.g., in accordance with a timer, as described elsewhere herein), PDCP re-establishment and data recovery for RLC acknowledged mode (AM), and duplication of PDCP PDUs. The PDCP layer may handle similar services and functions on the control plane, including sequence numbering, ciphering, deciphering, integrity protection, transfer of control plane data, duplicate detection, and duplication of PDCP PDUs.

The PDCP layer may provide data, in the form of PDCP PDUs, to the RLC layer via RLC channels. The RLC layer may handle transfer of upper layer PDUs to the MAC and/or PHY layers, sequence numbering independent of PDCP sequence numbering, error correction via automatic repeat requests (ARQ), segmentation and re-segmentation, reassembly of an SDU, RLC SDU discard, and RLC re-establishment.

The RLC layer may provide data, mapped to logical channels, to the MAC layer. The services and functions of the MAC layer include mapping between logical channels and transport channels (used by the PHY layer as described below), multiplexing/demultiplexing of MAC SDUs belonging to one or different logical channels into/from transport blocks (TBs) delivered to/from the physical layer on transport channels, scheduling information reporting, error correction through hybrid ARQ (HARD), priority handling between UEs by means of dynamic scheduling, priority handling between logical channels of one UE by means of logical channel prioritization, and padding.

The MAC layer may package data from logical channels into TBs, and may provide the TBs on one or more transport channels to the PHY layer. The PHY layer may handle various operations relating to transmission of a data signal, as described in more detail in connection with FIG. 2. The PHY layer is frequently referred to as Layer 1 (L1).

On the receiving side (e.g., if the UE 120 is receiving a downlink communication or the BS 110 is receiving an uplink communication), the operations may be similar to those described for the transmitting side, but reversed. For example, the PHY layer may receive TBs and may provide the TBs on one or more transport channels to the MAC layer. The MAC layer may map the transport channels to logical channels and may provide data to the RLC layer via the logical channels. The RLC layer may map the logical channels to RLC channels and may provide data to the PDCP layer via the RLC channels. The PDCP layer may map the RLC channels to radio bearers and may provide data to the SDAP layer or the RRC/NAS layer via the radio bearers.

Data may be passed between the layers in the form of PDUs and SDUs. An SDU is a unit of data that has been passed from a layer or sublayer to a lower layer. For example, the PDCP layer may receive a PDCP SDU. A given layer may then encapsulate the unit of data into a PDU and may pass the PDU to a lower layer. For example, the PDCP layer may encapsulate the PDCP SDU into a PDCP PDU and may pass the PDCP PDU to the RLC layer. The RLC layer may receive the PDCP PDU as an RLC SDU, may encapsulate the RLC SDU into an RLC PDU, and so on. In effect, the PDU carries the SDU as a payload.

As indicated above, FIG. 3 is provided as an example. Other examples may differ from what is described with regard to FIG. 3.

Figure 4:
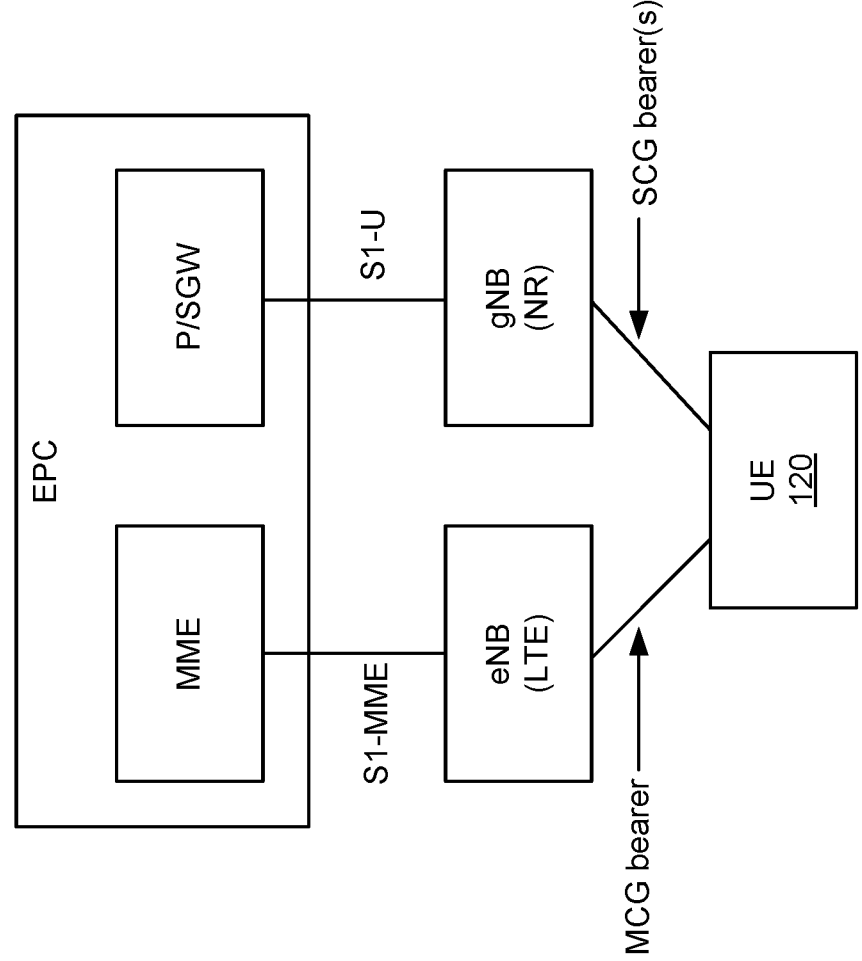
FIG. 4 is a diagram illustrating an example of dual connectivity, in accordance with the present disclosure.

FIG. 4 is a diagram illustrating an example 400 of dual connectivity, in accordance with the present disclosure. The example shown in FIG. 4 is for an Evolved Universal Mobile Telecommunications System Terrestrial Radio Access (E-UTRA)-NR dual connectivity (ENDC) mode. In the ENDC mode, a UE 120 communicates using an LTE RAT on a master cell group (MCG), and the UE 120 communicates using an NR RAT on an SCG. However, aspects described herein may apply to an ENDC mode (e.g., where the MCG is associated with an LTE RAT and the SCG is associated with an NR RAT), an NR-E-UTRA dual connectivity (NEDC) mode (e.g., where the MCG is associated with an NR RAT and the SCG is associated with an LTE RAT), an NR dual connectivity (NRDC) mode (e.g., where the MCG is associated with an NR RAT and the SCG is also associated with the NR RAT), or another dual connectivity mode (e.g., where the MCG is associated with a first RAT and the SCG is associated with one of the first RAT or a second RAT). The ENDC mode is sometimes referred to as an NR or 5G non-standalone (NSA) mode. Thus, as used herein, "dual connectivity mode" may refer to an ENDC mode, an NEDC mode, an NRDC mode, and/or another type of dual connectivity mode.

As shown in FIG. 4, a UE 120 may communicate with both an eNB (e.g., a 4G base station 110) and a gNB (e.g., a 5G base station 110), and the eNB and the gNB may communicate (e.g., directly or indirectly) with a 4G/LTE core network, shown as an evolved packet core (EPC) that includes a mobility management entity (MME), a packet data network gateway (PGW), a serving gateway (SGW), and/or other devices. In FIG. 4, the PGW and the SGW are shown collectively as P/SGW. In some aspects, the eNB and the gNB may be co-located at the same base station 110. In some aspects, the eNB and the gNB may be included in different base stations 110 (e.g., may not be co-located).

As further shown in FIG. 4, in some aspects, a wireless network that permits operation in a 5G NSA mode may permit such operations using an MCG for a first RAT (e.g., an LTE RAT or a 4G RAT) and an SCG for a second RAT (e.g., an NR RAT or a 5G RAT). In this case, the UE 120 may communicate with the eNB via the MCG and may communicate with the gNB via the SCG. In some aspects, the MCG may anchor a network connection between the UE 120 and the 4G/LTE core network (e.g., for mobility, coverage, and/or control plane information), and the SCG may be added as additional carriers to increase throughput (e.g., for data traffic and/or user plane information). In some aspects, the gNB and the eNB may not transfer user plane information between one another. In some aspects, a UE 120 operating in a dual connectivity mode may be concurrently connected with an LTE base station 110 (e.g., an eNB) and an NR base station 110 (e.g., a gNB) (e.g., in the case of ENDC or NEDC), or may be concurrently connected with one or more base stations 110 that use the same RAT (e.g., in the case of NRDC). In some aspects, the MCG may be associated with a first frequency band (e.g., a sub-6 GHz band and/or an FR1 band), and the SCG may be associated with a second frequency band (e.g., a millimeter wave band and/or an FR2 band).

The UE 120 may communicate via the MCG and the SCG using one or more radio bearers (e.g., DRBs and/or SRBs). For example, the UE 120 may transmit or receive data via the MCG and/or the SCG using one or more DRBs. Similarly, the UE 120 may transmit or receive control information (e.g., RRC information and/or measurement reports) using one or more SRBs. In some aspects, a radio bearer may be dedicated to a specific cell group (e.g., a radio bearer may be an MCG bearer or an SCG bearer). In some aspects, a radio bearer may be a split radio bearer. A split radio bearer may be split in the uplink and/or in the downlink. For example, a DRB may be split on the downlink (e.g., the UE 120 may receive downlink information for the MCG or the SCG in the DRB) but not on the uplink (e.g., the uplink may be non-split with a primary path to the MCG or the SCG, such that the UE 120 transmits in the uplink only on the primary path). In some aspects, a DRB may be split on the uplink with a primary path to the MCG or the SCG. A DRB that is split in the uplink may transmit data using the primary path until a size of an uplink transmit buffer satisfies an uplink data split threshold. If the uplink transmit buffer satisfies the uplink data split threshold, the UE 120 may transmit data to the MCG or the SCG using the DRB.

At the MAC layer of the UE 120, the UE 120 may be configured with two MAC entities, a first MAC entity for the MCG (e.g., an MCG MAC entity) and a second MAC entity for the SCG (e.g., an SCG MAC entity). Periodic or semi-persistent scheduling (SPS) resources can be configured on both the PCell (e.g., the MCG) and the PSCell (e.g., the SCG). In some examples, buffer status reporting may be performed independently for each cell group. For example, the UE 120 may transmit buffer status reports (BSRs) independently for the MCG and the SCG. For split radio bearers, PDCP data may be considered in the BSR associated with the cell group(s) configured by the base station 110 (e.g., in an RRC configuration). In some examples, there may be a one-to-one mapping between radio bearers and logical channels for buffer status reporting. For example, a first buffer status report may be associated with a first radio bearer and a first logical channel (e.g., for the MCG) and a second buffer status report may be associated with a second radio bearer and a second logical channel (e.g., for the SCG). In other words, the UE 120 may transmit different buffer status reports for data associated with the MCG and for data associated with the SCG.

In some cases, a PDCP entity associated with the UE 120 may be associated with the MCG and the SCG (e.g., the UE 120 may have a single PDCP entity). The UE 120 may be associated with an RLC entity for each of the MCG and the SCG (e.g., an MCG RLC entity and an SCG RLC entity). For example, the PDCP entity may provide PDCP PDUs to the MCG RLC entity for traffic to be transmitted via the MCG. Similarly, the PDCP entity may provide PDCP PDUs to the SCG RLC entity for traffic to be transmitted via the SCG.

In some cases, data can be received on both an MCG connection and an SCG connection (e.g., on a secondary cell group split bearer). Because data speed and latency may be different for the MCG connection and the SCG connection, this creates some challenges for UEs operating in a dual connectivity mode. For example, in scenarios where a 4G/LTE (e.g., associated with an MCG) connection experiences bad radio frequency conditions and performs HARQ and/or RLC retransmissions, a 5G/NR connection (e.g., associated with an SCG) can continue to receive data at a higher rate than the 4G/LTE connection. This can cause a number of out-of-order packets at the UE 120. The PDCP layer can provide reordering functionality and can increase sequence number length to 18 bits (e.g., compared to 12 bits in the 4G/LTE PDCP). While this helps to reorder data packets, it also means that large reorder buffers can be needed at the UE. In some cases, this could require up to 1.17 gigabytes of PDCP buffer for each radio bearer. Guaranteeing such large memory spaces in the modem is impractical. As a result, UEs can experience buffer congestion and buffer overflow at the PDCP layer, impacting upper layer performance and leading to poor user perception (e.g., based on transport control protocol (TCP) timeout and data stall). A reordering timer, which may be referred to as a t-reordering timer, may be used in the PDCP layer. When the t-reordering timer expires, the UE 120 can deliver data in the PDCP buffer to an upper layer of the UE 120. The t-reordering timer can be configured based on a value large enough to accommodate HARQ retransmission and RLC retransmission delays, to maintain sufficiently low packet loss rate.

As indicated above, FIG. 4 is provided as an example. Other examples may differ from what is described with respect to FIG. 4.

Figure 5:
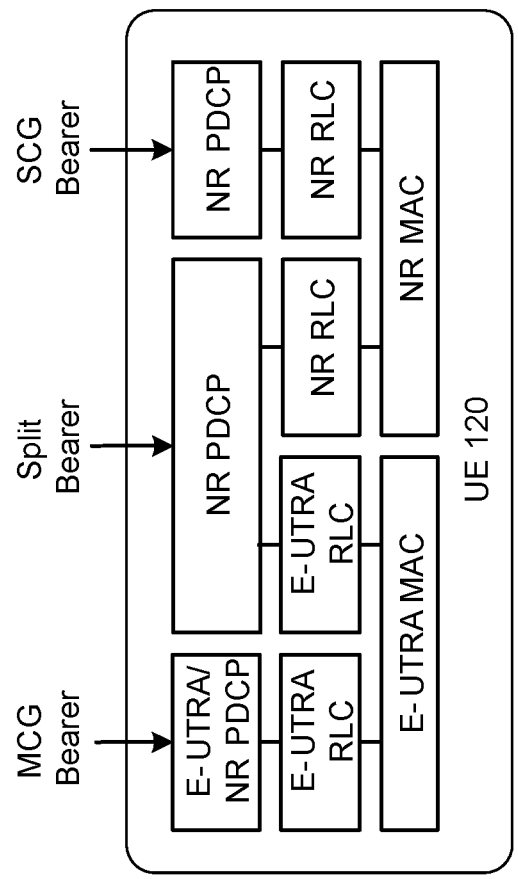
FIG. 5 is a diagram illustrating an example of a radio protocol architecture, in accordance with the present disclosure.

FIG. 5 is a diagram illustrating an example 500 of a radio protocol architecture, in accordance with the present disclosure.

As shown in FIG. 5, a radio protocol architecture for an MCG radio bearer, an SCG radio bearer, and a split radio bearer may be defined for a UE 120 in Multi-Radio Dual Connectivity (MR-DC) with ENDC. A split radio bearer may be associated with an NR PDCP entity, an E-UTRA RLC entity, and an NR RLC entity. In other words, the NR PDCP entity may communicate with the E-UTRA RLC entity and the NR RLC entity for data associated with the split radio bearer. For example, as shown in FIG. 5, the NR PDCP entity may direct data to the E-UTRA RLC entity (e.g., to be transmitted via the MCG) or to the NR RLC entity (e.g., to be transmitted via the SCG). As described above, example 500 is associated with an ENDC mode. However, a similar radio architecture may be used for other dual connectivity modes (e.g., where the MCG and the SCG are associated with different RATs than the RATs depicted in FIG. 5).

As indicated above, FIG. 5 is provided as an example. Other examples may differ from what is described with regard to FIG. 5.

In some cases, an SCG configured for a UE may be activated and/or deactivated by a base station (e.g., may be dynamically activated and/or deactivated). For example, the base station may transmit, and the UE may receive, an SCG deactivation command that indicates that an SCG configured for the UE is to be deactivated (e.g., is not to be used by the UE for data transmission or reception). The SCG deactivation command may be an RRC message or another control message. Upon receiving an SCG deactivation command, an SCG radio bearer (e.g., an SCG DRB) may be suspended by the UE 120. However, in some cases, split radio bearers may remain active or may not be suspended by the UE 120 (e.g., because the MCG is still active and/or configured).

In some cases, a PDCP entity associated with the UE 120 may not receive an indication of the SCG deactivation command (e.g., because the SCG deactivation command is an RRC message). For example, an RRC entity may receive the SCG deactivation command and may suspend or deactivate SCG radio bearers (e.g., by communicating with a MAC entity). However, the PDCP entity and/or an RLC entity may not be made aware of the SCG deactivation command. Therefore, for split radio bearers, the PDCP entity may continue to evaluate which RLC entity data is to be submitted based on one or more conditions. For example, the PDCP entity may submit data to a primary path until a size of an uplink transmit buffer satisfies an uplink data split threshold. If the uplink transmit buffer satisfies the uplink data split threshold, then the PDCP entity may submit data to an MCG RLC entity or an SCG RLC entity.

However, if the primary path for the split radio bearer is the SCG and a size of the uplink transmit buffer does not satisfy the uplink data split threshold, then the PDCP entity and/or the UE 120 may be unable to transmit the data (e.g., because the SCG is deactivated, and the data does not meet condition(s) for transmitting the data via the MCG and the split radio bearer). Additionally, in some cases, PDCP PDUs associated with a split radio bearer may have been provided to an SCG RLC entity prior to the UE 120 receiving the SCG deactivation command. When the SCG deactivation command is received by the UE 120, the PDCP PDUs may not be transmitted by the SCG RLC entity and/or the PDCP PDUs may not have been acknowledged by the base station (e.g., no acknowledgment (ACK) or negative ACK (NACK) feedback has been provided). As a result, a latency associated with transmitting the PDCP PDUs may be increased because the SCG RLC entity may be unable to transmit the data and/or receive ACK or NACK feedback associated with the data because the SCG is deactivated. Moreover, in some cases, this may cause packet loss because the UE is unable to transmit the data provided to the SCG RLC entity. Additionally, in the downlink for a split radio bearer, the UE may continue to perform packet or PDU reordering in accordance with a t-reordering timer. However, in some cases, this may increase latency associated with the data because the UE may wait for an expiration of the t-reordering timer even if data associated with the split radio bearer is only coming from the SCG. In other words, in some cases, data for the split radio bearer may be associated with the SCG when the SCG deactivation command is received. The UE 120 may wait for the expiration of the t-reordering timer to provide the data to upper layers even though the SCG is deactivated and no data from the MCG is expected. This increases a latency associated with the data.

Some techniques and apparatuses described herein enable PDCP and/or RLC handling for SCG deactivation scenarios. For example, some techniques and apparatuses described herein enable a PDCP entity and/or an RLC entity to efficiently handle data associated with a split radio bearer after receiving an SCG deactivation command. In some aspects, the UE may transmit, via the PDCP entity, data associated with the split radio bearer on an MCG regardless of one or more conditions for selecting a cell group to be associated with data for the split radio bearer. In other words, upon SCG deactivation, the PDCP entity may ignore the one or more conditions for selecting a cell group to be associated with data for the split radio bearer and may always provide the data to an RLC entity associated with the MCG. For example, the PDCP entity may receive, from an RRC entity or a MAC entity, an indication of the SCG deactivation. The PDCP entity may refrain from providing data (e.g., PDCP PDUs) associated with a split radio bearer to an RLC entity associated with the SCG based at least in part on receiving the indication of the SCG deactivation. In other words, the split radio bearer may remain as a split radio bearer for the PDCP entity (e.g., to avoid the need for a reconfiguration of the split radio bearer), but the PDCP entity may adapt or change PDU submission operations associated with the split radio bearer based at least in part on the SCG deactivation. As a result, latency may be reduced, and the UE may avoid packet loss for data associated with the split radio bearer In some aspects, the PDCP entity may transmit and/or retransmit PDCP PDUs, that were previously provided to an RLC entity associated with the SCG, via the MCG. For example, after receiving an SCG deactivation command, for PDCP PDUs that were previously provided to the SCG RLC entity but not yet transmitted or transmitted but not yet acknowledged by the base station, the PDCP entity may provide the PDCP PDUs to an MCG RLC entity to be transmitted via the MCG. In some aspects, the UE may modify a t-reordering timer associated with the PDCP entity based at least in part on receiving an SCG deactivation command. For example, if all (or a threshold number of) PDUs in a PDCP buffer are associated with the SCG, the PDCP entity may reduce an amount of time associated with the t-reordering timer (e.g., to zero or to another amount of time) based at least in part on receiving an SCG deactivation command. The PDCP entity may provide the PDUs to upper layer(s) of the UE based at least in part on reducing the amount of time associated with the t-reordering timer.

In some aspects, after receiving an SCG deactivation command, the UE may transmit, and the base station may receive, a buffer status report associated with an SCG radio bearer based at least in part on receiving the data to be transmitted via the SCG radio bearer. For example, the UE may receive data (e.g., from an application layer) to be transmitted via the SCG after the SCG is deactivated. The UE may notify the base station that the UE has data to be transmitted via the SCG. For example, in some aspects, an SCG bearer buffer report may be transmitted via an MCG buffer status report. The MCG buffer status report may include an indication than an SCG buffer status report is included in the MCG buffer status report. As another example, the UE may transmit an RRC message, such as a UE assistance information message, indicating that the UE has data to be transmitted via the SCG. As a result, the base station may reconfigure the radio bearer to be associated with the MCG or may activate the SCG (e.g., may enable the SCG path). This may reduce latency associated with the data because the UE may be enabled to transmit the data faster by receiving the reconfiguration of the radio bearer or by receiving the activation of the SCG.

As a result, an efficiency associated with transmitting data associated with the SCG and/or a split radio bearer after receiving an SCG deactivation command may be improved. For example, the PDCP entity may reduce latency and/or avoid packet loss by refraining from submitting PDUs associated with a split radio bearer to an RLC entity associated with the SCG. As another example, a latency associated with PDUs provided to an SCG RLC entity prior to receiving an SCG deactivation command may be reduced by the PDCP entity transmitting or retransmitting the PDUs via an MCG RLC entity. As another example, a latency associated with receiving downlink data via a split radio bearer may be reduced by the PDCP entity modifying an amount of time associated with a t-reordering timer when the data is associated with the SCG. As another example, latency associated with data associated with the SCG that arrives at the UE after the UE receives the SCG deactivation command may be reduced by the UE transmitting an indication to the network (e.g., to the base station) that the UE has data associated with the SCG (e.g., associated with an SCG radio bearer).

Figure 6A:
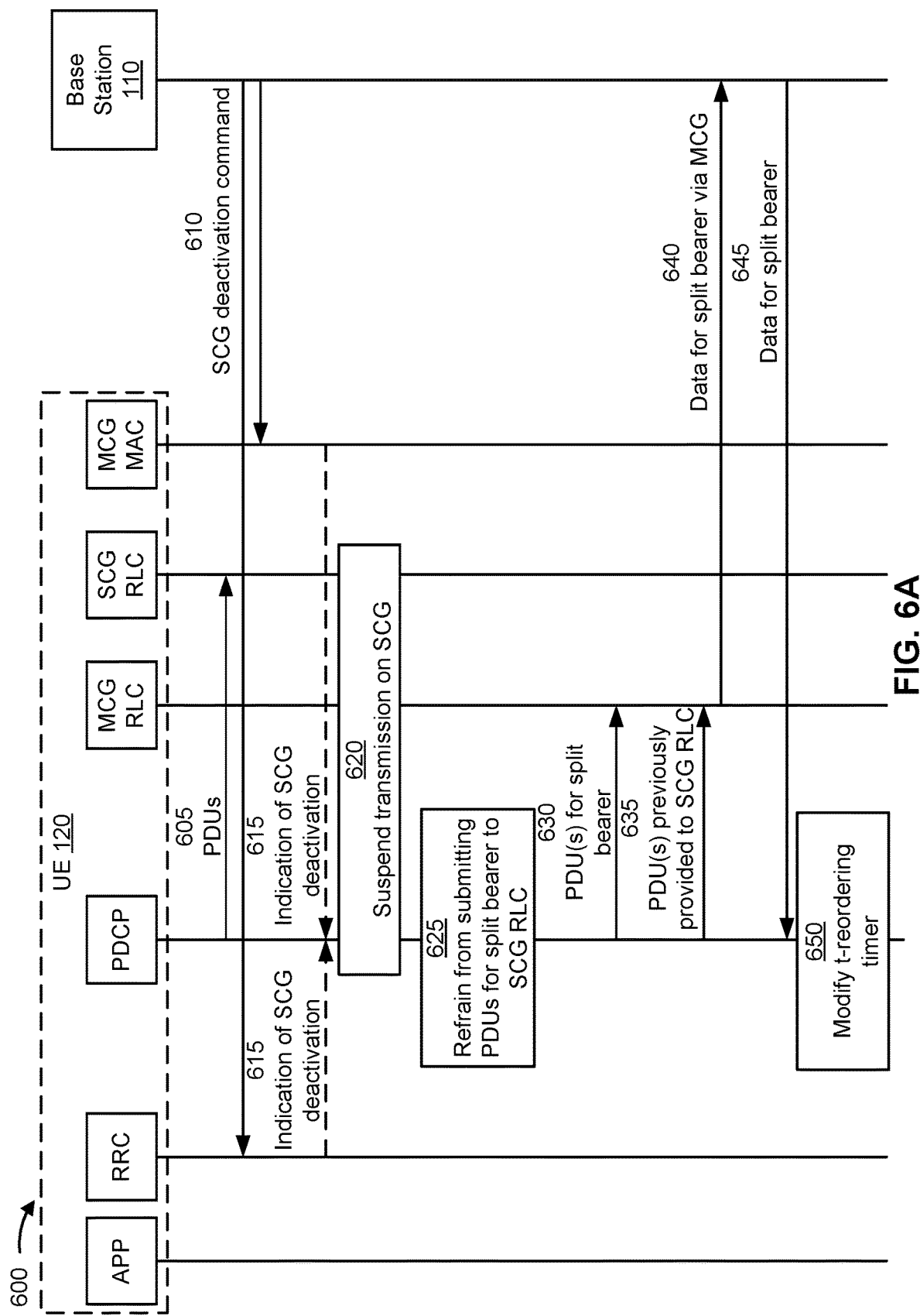
FIGS. 6A and 6B are diagrams illustrating an example associated packet data convergence protocol (PDCP) handling for secondary cell group (SCG) deactivation, in accordance with the present disclosure.
Figure 6B:
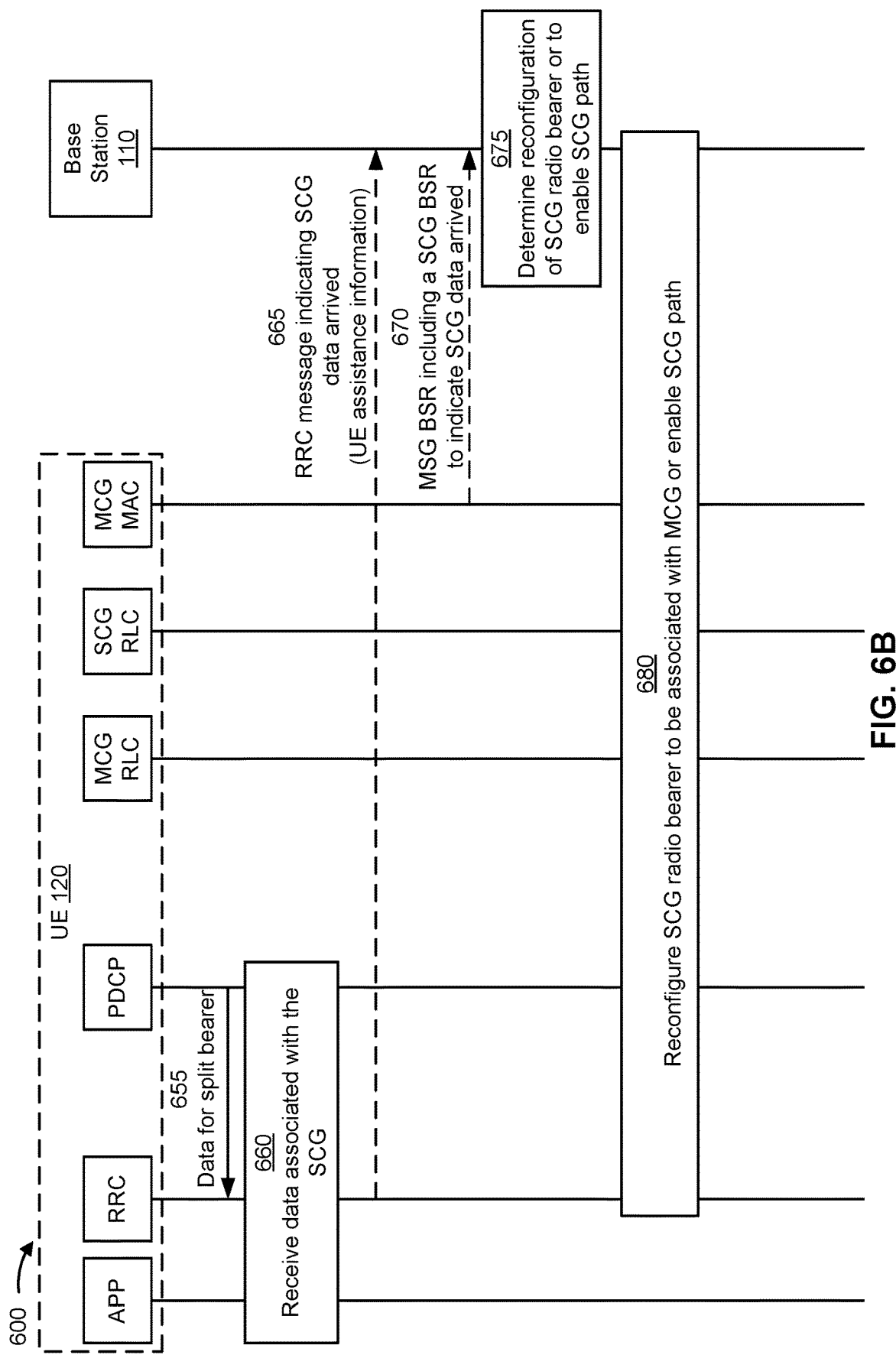

FIGS. 6A and 6B are diagrams illustrating an example 600 associated with PDCP handling for SCG deactivation, in accordance with the present disclosure. As shown in FIGS. 6A and 6B, a base station 110 and a UE 120 may communicate with one another in a wireless network, such as the wireless network 100. As shown in FIGS. 6A and 6B, the UE 120 may include an APP entity, an RRC entity, a PDCP entity, an MCG RLC entity, an SCG RLC entity, and a MAC entity, among other examples. The base station 110 may include corresponding entities or layers (not shown in FIGS. 6A and 6B), in a similar manner as described in connection with FIG. 3. While FIGS. 6A and 6B depict a single MAC entity (e.g., an MCG MAC entity), in some example, the UE 120 may be configured with an MCG MAC entity and an SCG MAC entity. The UE 120 may be configured to operate in a dual connectivity mode associated with an MCG and an SCG (e.g., in a similar manner as described in connection with FIGS. 4 and 5). For example, the MCG RLC entity may be associated with the MCG and the SCG RLC entity may be associated with the SCG.

As shown by reference number 605, the PDCP entity may transmit, and the SCG RLC entity may receive, one or more PDUs (e.g., one or more PDCP PDUs) associated with a split radio bearer. For example, the PDCP entity may submit the PDUs to the SCG RLC entity based at least in part on one or more conditions associated with selecting a cell group to be associated with data for the split radio bearer. For example, a split radio bearer may be associated with a primary path (e.g., the MCG or the SCG) and an uplink data split threshold. The PDCP entity may submit the PDUs to the SCG RLC entity based at least in part on the SCG being the primary path for the split radio bearer and/or based at least in part on a size of the uplink buffer satisfying the uplink data split threshold. In some aspects, the SCG RLC entity may prepare the PDUs to be transmitted to the base station 110 by generating and adding an RLC header to the PDUs. For example, as part of transmitting the PDUs, the SCG RLC entity may generate an RLC sequence number (SN) for each PDU. In some aspects, the UE 120 (e.g., via the SCG RLC entity) may transmit one or more (or all) of the PDUs to the base station 110 via the SCG.

As shown by reference number 610, the base station 110 may transmit, and the UE 120 may receive, an SCG deactivation command indicating that an SCG associated with the UE 120 is deactivated. "Deactivation" of an SCG may refer to the base station 110 indicating that data is not to be transmitted by the UE 120 via the SCG, but that the SCG is to remain configured for the UE 120. The SCG deactivation command may be a dynamic message transmitted by the base station 110. In some aspects, the SCG deactivation command may be an RRC message. In some other aspects, the SCG deactivation command may be a MAC message. In some aspects, the SCG deactivation command may be transmitted by the base station 110 via PHY signaling, MAC signaling, RLC signaling, and/or PDCP signaling, among other examples.

In some aspects, the PDCP entity may be unaware of the SCG deactivation. For example, the RRC entity and/or the MAC entity may receive indication(s) of the SCG deactivation to enable the SCG radio bearer(s) to be suspended. The UE 120 may perform one or more actions associated the PDCP entity and a split radio bearer associated with the SCG based at least in part on the UE 120 receiving the SCG deactivation command. For example, in some aspects, as shown by reference number 615, the UE 120 may transmit, from the MAC entity or the RRC entity and to the PDCP entity, an indication that the SCG is deactivated based at least in part on the UE 120 receiving the SCG deactivation command. For example, the RRC entity and/or the MAC entity may provide information to the PDCP entity associated with the SCG deactivation command. In other words, the PDCP entity may be notified or may be made aware that the SCG is deactivated.

As shown by reference number 620, the UE 120 may suspend transmission and/or reception on the SCG based at least in part on receiving the SCG deactivation command. For example, the UE 120 may suspend one or more configured SCG radio bearers based at least in part on receiving the SCG deactivation command. For example, the UE 120 (e.g., via the RRC entity and/or the MAC entity) may suspend an SCG DRB. In other words, the UE 120 may perform an action to prevent traffic from being transmitted via the SCG DRB because the SCG is deactivated. However, the UE 120 may be configured with a split radio bearer (e.g., an uplink split radio bearer). Because the MCG is still active and configured, the uplink split radio bearer may not be suspended by the UE 120 (e.g., to enable data to be transmitted via the MCG and the uplink split radio bearer).

Example 600 describes the one or more actions associated with the PDCP entity and the split radio bearer associated with the SCG as performed from by the UE 120. However, similar actions as described herein (e.g., described as being performed by the UE 120) may be performed by the base station 110 via the corresponding PDCP entity of the base station 110. For example, actions described in connection with the UE 120 transmitting uplink data may similarly be performed by the base station 110 and/or a PDCP entity associated with the base station 110 when the base station 110 is transmitting downlink data. Similarly, actions described in connection with the UE 120 receiving downlink data may similarly be performed by the base station 110 and/or a PDCP entity associated with the base station 110 when the base station 110 is receiving uplink data. In other words, actions described herein by the UE 120 as a transmitting entity may similarly be performed by the base station 110 when the base station 110 is the transmitting entity. Actions described herein by the UE 120 as a receiving entity may similarly be performed by the base station 110 when the base station 110 is the receiving entity.

The one or more actions associated with the PDCP entity and the split radio bearer associated with the SCG may include ignoring any threshold checks and/or the primary path logic associated with the split radio bearer when the SCG is deactivated. For example, as shown by reference number 625, the PDCP entity may refrain from providing PDUs associated with a split radio bearer to an RLC entity associated with the SCG (e.g., the SCG RLC entity) based at least in part on receiving the indication that the SCG is deactivated from the MAC entity or the RRC entity. For example, because the SCG is deactivated, the PDCP entity may not provide PDUs associated with an uplink split radio bearer to the SCG RLC entity because the SCG RLC entity is not permitted to transmit the PDUs via the SCG. In some aspects, the PDCP entity may ignore the one or more conditions for selecting a cell group to be associated with the split radio bearer. For example, as described in more details elsewhere herein, the one or more conditions may include a threshold associated with a size of the data (e.g., an uplink data split threshold) and/or a primary path associated with the split radio bearer, among other examples. The PDCP entity may transmit or provide data (e.g., PDUs) to the MCG RLC entity for the split radio bearer regardless of the one or more conditions. This may enable the data to be transmitted via the MCG, thereby reducing latency associated with transmitting the data. For example, when the primary path associated with the split radio bearer is the SCG and the SCG is deactivated, the UE 120 may be unable to transmit data associated with the split radio bearer when a size of the data to be transmitted does not satisfy the uplink data split threshold. By ignoring the one or more conditions associated with the split radio bearer (e.g., by ignoring the primary path and/or uplink data split threshold) and by providing the data to the MCG RLC entity, the UE 120 may reduce a latency and/or reduce a likelihood of packet loss associated with traffic to be transmitted via the split radio bearer.

For example, as shown by reference number 630, the PDCP entity may direct all traffic associated with the uplink split radio bearer to the MCG RLC entity regardless of a primary path associated with the split radio bearer and/or regardless of a size of the data to be transmitted (e.g., based at least in part on the SCG being deactivated). This enables the data to be transmitted sooner and also enables the split radio bearer to remain configured as a split radio bearer. For example, a reconfiguration of the split radio bearer (e.g., to an MCG radio bearer) may not be needed because the PDCP entity may direct all traffic associated with the split radio bearer to the MCG RLC entity, as described in more detail elsewhere herein. As a result, if the SCG is activated (e.g., dynamically by the base station 110), the PDCP entity may resume submitting traffic associated with the split radio bearer to the MCG RLC entity or the SCG RLC entity in accordance with the one or more conditions associated with the split radio bearer. This may conserve time and/or reduce a signaling overhead that would have otherwise been used to reconfigure the split radio bearer.

As described above in connection with reference number 605, the PDCP entity may provide one or more PDUs associated with the split radio bearer to the SCG RLC entity prior to the UE 120 receiving the SCG deactivation command. The one or more actions associated the PDCP entity and the split radio bearer associated with the SCG may include transmitting one or more PDUs previously provided to the SCG RLC entity via the MCG RLC entity. For example, as shown by reference number 635, the PDCP entity may perform one or more actions to transmit or retransmit the PDUs via the MCG and/or the MCG RLC entity. The PDUs may be PDUs previously provided to the SCG RLC entity that remain in the SCG RLC entity when the SCG deactivation command is received. For example, the PDUs may be PDUs that were previously provided to the SCG RLC entity, but that have not yet been transmitted by the SCG RLC entity (e.g., that have not yet been assigned an RLC SN). As another example, the PDUs may be PDUs that were previously provided to the SCG RLC entity and that have been transmitted by the SCG RLC entity (e.g., via the SCG), but that have not yet been acknowledged by the base station 110. Therefore, the PDUs may remain in the SCG RLC entity at the time when the SCG deactivation command is received by the UE 120.

For example, the one or more actions associated with the PDCP entity and the split radio bearer associated with the SCG may include one or PDUs, that are associated with a first RLC entity that is associated with the SCG (e.g., the SCG RLC entity), via a second RLC entity that is associated with the MCG (e.g., the MCG RLC entity). For example, where the one or more PDUs were provided to the SCG RLC entity via the PDCP entity, and where the one or more PDUs have not been transmitted via the SCG RLC entity, the SCG RLC entity may return the one or more PDUs to the PDCP entity (e.g., may transmit the one or more PDUs from the SCG RLC entity to the PDCP entity). The PDCP entity may provide the one or more PDUs to the MCG RLC entity (e.g., the UE 120 may transmit the one or more PDUs from the PDCP entity to the MCG RLC entity). The UE 120 may transmit, and the base station 110 may receive, the one or more PDUs via the MCG RLC entity and the MCG. As another example, where the one or more PDUs were provided to the SCG RLC entity via the PDCP entity, and where the one or more PDUs have been transmitted via the SCG RLC entity and the SCG and have not been acknowledged by the base station 110 (e.g., no ACK or NACK feedback has been received), the SCG RLC entity may return the one or more PDUs to the PDCP entity (e.g., the UE 120 may transmit the one or more PDUs from the SCG RLC entity to the PDCP entity). The PDCP entity may provide the one or more PDUs to the MCG RLC entity for retransmission (e.g., the UE 120 may transmit the one or more PDUs from the PDCP entity to the MCG RLC entity for retransmission). The UE 120 may retransmit, to the base station 110, the one or more PDUs via the MCG RLC entity and the MCG. In some aspects, the retransmitted PDUs may be associated with an RLC SN that was assigned by the SCG RLC entity (e.g., in an initial transmission of the PDU(s)).

As shown by reference number 640, the UE 120 may transmit (e.g., via the MCG RLC entity), and the base station 110 may receive, data associated with the split radio bearer via the MCG. For example, as described above, the one or more actions performed by the UE 120 may cause data associated with the split radio bearer to be transmitted via the MCG and/or via the MCG RLC entity. For example, the PDCP entity may automatically direct traffic associated with the split radio bearer to the MCG RLC entity (e.g., regardless of the one or more conditions associated with the split radio bearer) after the UE 120 receives the SCG deactivation command. As another example, the PDCP entity may redirect PDUs, that were previously provided to the SCG RLC entity and that remain in the SCG RLC entity, to the MCG RLC entity for transmission or retransmission via the MCG after the UE 120 receives the SCG deactivation command.

As shown by reference number 645, the base station 110 may transmit, and the UE 120 may receive, data associated with the split radio bearer. Although FIG. 6A depicts the data being transmitted by the base station 110 after the base station 110 transmits the SCG deactivation command, in some cases, the base station 110 may transmit the data prior to transmitting the SCG deactivation command. For example, one or more packets or PDUs associated with the data may be included in a buffer associated with the PDCP entity after the UE 120 receives the SCG deactivation command. In some aspects, as shown by reference number 650, the one or more actions associated the PDCP entity and the split radio bearer associated with the SCG may include modifying an amount of time for a timer (e.g., a t-reordering timer) associated with a buffering window for reordering packets associated with the split radio bearer received via the PDCP entity based at least in part on the SCG being deactivated. Modifying the amount of time associated with the t-reordering timer for a split radio bearer may be based at least in part on whether there is any traffic present (e.g., in the buffer associated with the PDCP) that is associated with the MCG. For example, the UE 120 may receive, via the PDCP entity, one or more packets, where each packet of the one or more packets is associated with the split radio bearer and the SCG. In other words, all the active scheduling may be coming from the SCG and no scheduling may be coming from the MCG. Therefore, the UE 120 may identify that no traffic is expected from the MCG via the split radio bearer. As a result, the UE 120 (e.g., via the PDCP entity) may reduce the amount of time associated with the t-reordering timer to zero based at least in part on each packet of the one or more packets included in the buffer being associated with the SCG (e.g., because the SCG is deactivated and no additional traffic may be transmitted via the SCG). In some aspects, any gaps or holes in SNs of packets stored in the PDCP buffer may be equal to gaps or holes in SNs for the SCG or MCG RLC entity (e.g., because the RLC entities and the PDCP entity have a one-to-one SN relation). In some other aspects, the UE 120 may not modify or reduce the amount of time associated with the t-reordering timer and may wait for the t-reordering timer to expire prior to providing the packet(s) stored in the PDCP buffer to upper layers.

In some aspects, the UE 120 and/or the PDCP entity may reduce the amount of time associated with the t-reordering time to an amount of time that is greater than zero (e.g., zero milliseconds). For example, if there are any packets associated with the MCG stored in the PDCP buffer associated with the split radio bearer, then the UE 120 may not modify the amount of time or may reduce the amount of time to an amount greater than zero to allow for additional packets to be received via the MCG. In other words, if there are any packets that have been received by the UE 120 from the MCG via the split radio bearer, then the UE 120 may expect some additional packets from the MCG. Because the MCG is still active, the UE 120 may not reduce the amount of time associated with the t-reordering timer to zero. In some aspects, an amount by which the amount of time is reduced by may be based at least in part on a number of packets stored in the PDCP buffer that are associated with the MCG. For example, if 20% of the packets stored in the PDCP buffer for the split radio bearer are associated with the MCG, then the UE 120 may reduce the amount of time associated with the t-reordering timer to 20% of the original or configured amount of time.

As shown in FIG. 6B, and by reference number 655, the PDCP entity may provide the data (e.g., associated with the split radio bearer) to an upper layer (e.g., to another logical entity associated with the UE 120, such as the RRC entity). For example, the PDCP entity may deliver data in the PDCP buffer to an upper layer of the UE 120. For example, where all data or packets stored in the PDCP buffer associated with the split radio bearer are associated with the SCG, the PDCP entity may flush the PDCP reordering window and may provide data in the PDCP buffer to an upper layer of the UE 120 after the UE 120 receives the SCG activation command (e.g., without waiting for the t-reordering timer to expire or by reducing the amount of time associated with the t-reordering timer to zero). As another example, the PDCP entity may reduce the amount of time associated with the t-reordering timer (e.g., from the configured amount of time associated with the t-reordering timer) and may transmit, from the PDCP entity to the RRC entity or another logical entity, the packets stored in the PDCP buffer after an expiration of the t-reordering timer. This may reduce a latency associated with data received via a downlink split radio bearer after the SCG has been deactivated by reducing the amount of time that the data is stored in the PDCP buffer.

In some aspects, the PDCP entity may provide the data stored in the PDCP buffer associated with the downlink split radio bearer after an expiration of the t-reordering timer (e.g., without modifying or reducing the amount of time associated with the t-reordering timer). This may allow the base station 110 to transmit any missing PDCP PDUs associated with the downlink split radio bearer via the MCG RLC entity and the MCG after the SCG is deactivated.

As shown by reference number 660, the UE 120 may receive data to be transmitted via the SCG after the UE 120 receives the SCG deactivation command. For example, data may arrive from an application or an application entity associated with the UE 120 (e.g., the APP entity). For example, in some aspects, the APP entity may provide data to the RRC entity and/or the PDCP entity. The data may be associated with an uplink radio bearer that is associated with the SCG (e.g., an SCG uplink radio bearer). The SCG uplink radio bearer may be an SCG DRB that has been suspended by the UE 120 based at least in part on the deactivation of the SCG, as described in more detail elsewhere herein. As described above, the UE 120 may typically report, to the base station 110, that the UE 120 has data to be transmitted via the SCG by transmitting a buffer status report associated with the SCG. However, an SCG buffer status report may only be transmitted via the SCG (e.g., as defined, other otherwise fixed, by a wireless communication standard, such as the 3GPP). Therefore, the one or more actions associated the PDCP entity may include transmitting, to the base station 110, an indication that the UE 120 has data to be transmitted via the SCG. For example, as shown by reference number 665, an RRC message may indicate that the data that is associated with the SCG has arrived at the UE 120. For example, the RRC message may be a UE assistance information (UAI) message that indicates that the UE 120 has received data associated with an SCG uplink radio bearer. In some aspects, the PDCP entity may provide, to the RRC entity, an indication that the data that is associated with the SCG has arrived at the UE 120 (e.g., has arrived at the PDCP entity). The RRC entity may transmit the RRC message indicating that the UE 120 has data to be transmitted via the SCG (e.g., based at least in part on receiving the indication from the PDCP entity).

As another example and as shown by reference number 670, the UE 120 may transmit a buffer status report associated with the radio bearer and the SCG based at least in part on receiving the data to be transmitted via the radio bearer associated with the SCG. For example, the UE 120 may transmit a message, via an MCG radio bearer, where the message includes a first buffer status report (e.g., indicating the data associated with the SCG uplink radio bearer) and a second buffer status report associated with the MCG (e.g., indicating data associated with an MCG uplink radio bearer). In other words, the UE 120 may transmit the buffer status report for deactivated cell group (e.g., the SCG in example 600) via a different cell group (e.g., the MCG in the example 600). For example, when the SCG is deactivated, an SCG buffer status report may be transmitted via (e.g., may be transmitted in) an MCG buffer status report. For example, the message may be an MCG buffer status report. The message (e.g., the MCG buffer status report) may include an indication that the message includes the buffer status report associated with the radio bearer and the SCG. For example, the MCG buffer status report may include a bit that indicates, to the base station 110, that the MCG buffer status report message includes information associated with an SCG buffer status report. As shown in FIG. 6B, the message (e.g., the MCG buffer status report) may be a MAC message (e.g., may be transmitted via the MAC entity).

As shown by reference number 675, the base station 110 may determine a reconfiguration of the SCG uplink radio bearer or may enable the SCG path based at least in part on receiving the indication that the UE 120 has data to be transmitted via the SCG, as described above. For example, the base station 110 may determine to reconfigure the SCG uplink radio bearer to be associated with the MCG to enable the UE 120 to transmit the data via the MCG. As another example, the base station 110 may determine to enable the SCG path. For example, the base station 110 may determine that the SCG should be activated for the UE 120.

As shown by reference number 680, the base station 110 may perform an action to reconfigure the SCG uplink radio bearer and/or to enable the SCG path. For example, the base station 110 may transmit, and the UE 120 may receive, a message to reconfigure the SCG uplink radio bearer to be associated with the MCG or to activate the SCG based at least in part on transmitting the buffer status report associated with the radio bearer and the SCG. In some aspects, the base station 110 may transmit, and the UE 120 may receive, a radio bearer reconfiguration to reconfigure the SCG uplink radio bearer to be associated with the MCG (e.g., rather than the SCG). In some other aspects, the base station 110 may transmit, and the UE 120 may receive, an SCG activation command to activate the SCG. As a result, the UE 120 may be enabled to transmit the data that arrived at the UE after the SCG is deactivated by transmitting the data via the MCG on the reconfigured uplink radio bearer or by transmitting the data via the activated SCG. This may reduce a latency associated with transmitting the data because the base station 110 may be altered to perform an action to enable the transmission of the data, rather than the UE 120 being required to wait for the SCG to be activated independently by the base station 110.

As a result, an efficiency associated with transmitting data associated with the SCG and/or a split radio bearer after receiving an SCG deactivation command may be improved. For example, the PDCP entity may reduce latency and/or avoid packet loss by refraining from submitting PDUs associated with a split radio bearer to an RLC entity associated with the SCG. As another example, a latency associated with PDUs provided to an SCG RLC entity prior to receiving an SCG deactivation command may be reduced by the PDCP entity transmitting or retransmitting the PDUs via an MCG RLC entity. As another example, a latency associated with receiving downlink data via a split radio bearer may be reduced by the PDCP entity modifying an amount of time associated with a t-reordering timer when the data is associated with the SCG. As another example, latency associated with data associated with the SCG that arrives at the UE after the UE receives the SCG deactivation command may be reduced by the UE transmitting an indication to the network (e.g., to the base station) that the UE has data associated with the SCG (e.g., associated with an SCG radio bearer).

As indicated above, FIGS. 6A and 6B are provided as examples. Other examples may differ from what is described with respect to FIGS. 6A and 6B.

FIG. 7 is a diagram illustrating an example process 700 performed, for example, by a UE, in accordance with the present disclosure. Example process 700 is an example where the UE (e.g., UE 120) performs operations associated with PDCP handling for SCG deactivation.

As shown in FIG. 7, in some aspects, process 700 may include receiving, from a base station, an SCG deactivation command indicating that an SCG associated with the UE is deactivated (block 710). For example, the UE (e.g., using communication manager 140 and/or reception component 902, depicted in FIG. 9) may receive, from a base station, an SCG deactivation command indicating that an SCG associated with the UE is deactivated, as described above.

As further shown in FIG. 7, in some aspects, process 700 may include performing an action associated with a PDCP entity and a split radio bearer associated with the SCG based at least in part on receiving the SCG deactivation command (block 720). For example, the UE (e.g., using communication manager 140 and/or PDCP SCG deactivation handling component 908, depicted in FIG. 9) may perform an action associated with a PDCP entity and a split radio bearer associated with the SCG based at least in part on receiving the SCG deactivation command, as described above.

Process 700 may include additional aspects, such as any single aspect or any combination of aspects described below and/or in connection with one or more other processes described elsewhere herein.

With respect to process 700, in a first aspect, performing the action includes transmitting, via the PDCP entity, data associated with the split radio bearer on an MCG regardless of one or more conditions for selecting a cell group to be associated with the split radio bearer.

With respect to process 700, in a second aspect, alone or in combination with the first aspect, the one or more conditions include at least one of a threshold associated with a size of the data, or a primary path associated with the split radio bearer.

With respect to process 700, in a third aspect, alone or in combination with one or more of the first and second aspects, performing the action includes transmitting one or more PDUs, that are associated with a first RLC entity that is associated with the SCG, via a second RLC entity that is associated with an MCG.

With respect to process 700, in a fourth aspect, alone or in combination with one or more of the first through third aspects, the one or more PDUs were provided to the first RLC entity via the PDCP entity, and wherein the one or more PDUs have not been transmitted via the first RLC entity, and wherein transmitting the one or more PDUs includes transmitting, to the base station, the one or more PDUs, that have not been transmitted via the first RLC entity, via the second RLC entity and the MCG.

With respect to process 700, in a fifth aspect, alone or in combination with one or more of the first through fourth aspects, the one or more PDUs were provided to the first RLC entity via the PDCP entity, and wherein the one or more PDUs have been transmitted via the first RLC entity and the SCG and have not been acknowledged by the base station, and wherein transmitting the one or more PDUs includes transmitting, to the base station, the one or more PDUs that have been transmitted via the first RLC entity but have not been acknowledged by the base station, via the second RLC entity and the MCG.

With respect to process 700, in a sixth aspect, alone or in combination with one or more of the first through fifth aspects, performing the action includes providing, from an MAC entity or an RRC entity to the PDCP entity, an indication that the SCG is deactivated based at least in part on receiving the SCG deactivation command.

With respect to process 700, in a seventh aspect, alone or in combination with one or more of the first through sixth aspects, process 700 includes refraining, via the PDCP entity, from providing PDUs associated with the split radio bearer to an RLC entity associated with the SCG based at least in part on receiving the indication that the SCG is deactivated from the MAC entity or the RRC entity.

With respect to process 700, in an eighth aspect, alone or in combination with one or more of the first through seventh aspects, process 700 includes providing, via the PDCP entity, PDUs associated with the split radio bearer to an RLC entity associated with an MCG regardless of one or more conditions for selecting a cell group to be associated with the split radio bearer based at least in part on receiving the indication that the SCG is deactivated from the MAC entity or the RRC entity.

With respect to process 700, in a ninth aspect, alone or in combination with one or more of the first through eighth aspects, performing the action includes modifying, via the PDCP entity, an amount of time for a timer associated with a buffering window for reordering packets associated with the split radio bearer received via the PDCP entity based at least in part on the SCG being deactivated.

With respect to process 700, in a tenth aspect, alone or in combination with one or more of the first through ninth aspects, process 700 includes receiving, via the PDCP entity, one or more packets, wherein each packet of the one or more packets is associated with the split radio bearer and the SCG, and modifying the amount of time for the timer includes reducing the amount of time to zero based at least in part on each packet of the one or more packets being associated with the SCG, and providing, from the PDCP entity to another logical entity associated with the UE, the one or more packets based at least in part on reducing the amount of time to zero.

With respect to process 700, in an eleventh aspect, alone or in combination with one or more of the first through tenth aspects, modifying the amount of time for the timer includes reducing the amount of time associated with the timer.

With respect to process 700, in a twelfth aspect, alone or in combination with one or more of the first through eleventh aspects, process 700 includes receiving, via the PDCP entity, one or more packets, wherein at least one packet, of the one or more packets, is associated with the SCG and at least one packet, of the one or more packets, is associated with an MCG, and modifying the amount of time for the timer includes reducing the amount of time to a value greater than zero.

With respect to process 700, in a thirteenth aspect, alone or in combination with one or more of the first through twelfth aspects, the timer is a t-reordering timer.

With respect to process 700, in a fourteenth aspect, alone or in combination with one or more of the first through thirteenth aspects, process 700 includes receiving, via the PDCP entity, one or more packets, wherein each packet of the one or more packets is associated with the split radio bearer and the SCG, and performing the action includes providing, via the PDCP entity and to another logical entity associated with the UE, the one or more packets based at least in part on an expiration of a timer associated with a buffering window for reordering packets associated with the split radio bearer received via the PDCP entity.

With respect to process 700, in a fifteenth aspect, alone or in combination with one or more of the first through fourteenth aspects, process 700 includes receiving, via the PDCP entity, data to be transmitted via a radio bearer associated with the SCG after receiving the SCG deactivation command, and performing the action includes transmitting, to the base station, a buffer status report associated with the radio bearer and the SCG based at least in part on receiving the data to be transmitted via the radio bearer associated with the SCG.

With respect to process 700, in a sixteenth aspect, alone or in combination with one or more of the first through fifteenth aspects, the buffer status report is a first buffer status report, and transmitting the buffer status report associated with the radio bearer and the SCG includes transmitting, to the base station, a message, via an MCG radio bearer, wherein the message includes the first buffer status report and a second buffer status report associated with the MCG.

With respect to process 700, in a seventeenth aspect, alone or in combination with one or more of the first through sixteenth aspects, the message includes an indication that the message includes the buffer status report associated with the radio bearer and the SCG.

With respect to process 700, in an eighteenth aspect, alone or in combination with one or more of the first through seventeenth aspects, the message is a medium access control message.

With respect to process 700, in a nineteenth aspect, alone or in combination with one or more of the first through eighteenth aspects, transmitting the buffer status report associated with the radio bearer and the SCG includes transmitting, to the base station, an RRC message indicating that the data that is associated with the SCG has arrived at the UE.

With respect to process 700, in a twentieth aspect, alone or in combination with one or more of the first through nineteenth aspects, the RRC message is a UE assistance information message.

With respect to process 700, in a twenty-first aspect, alone or in combination with one or more of the first through twentieth aspects, process 700 includes receiving, from the base station, a message to reconfigure the radio bearer to be associated with an MCG or to activate the SCG based at least in part on transmitting the buffer status report associated with the radio bearer and the SCG or based at least in part on transmitting a radio resource control (RRC) message indicating that the data that is associated with the SCG has arrived at the UE.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
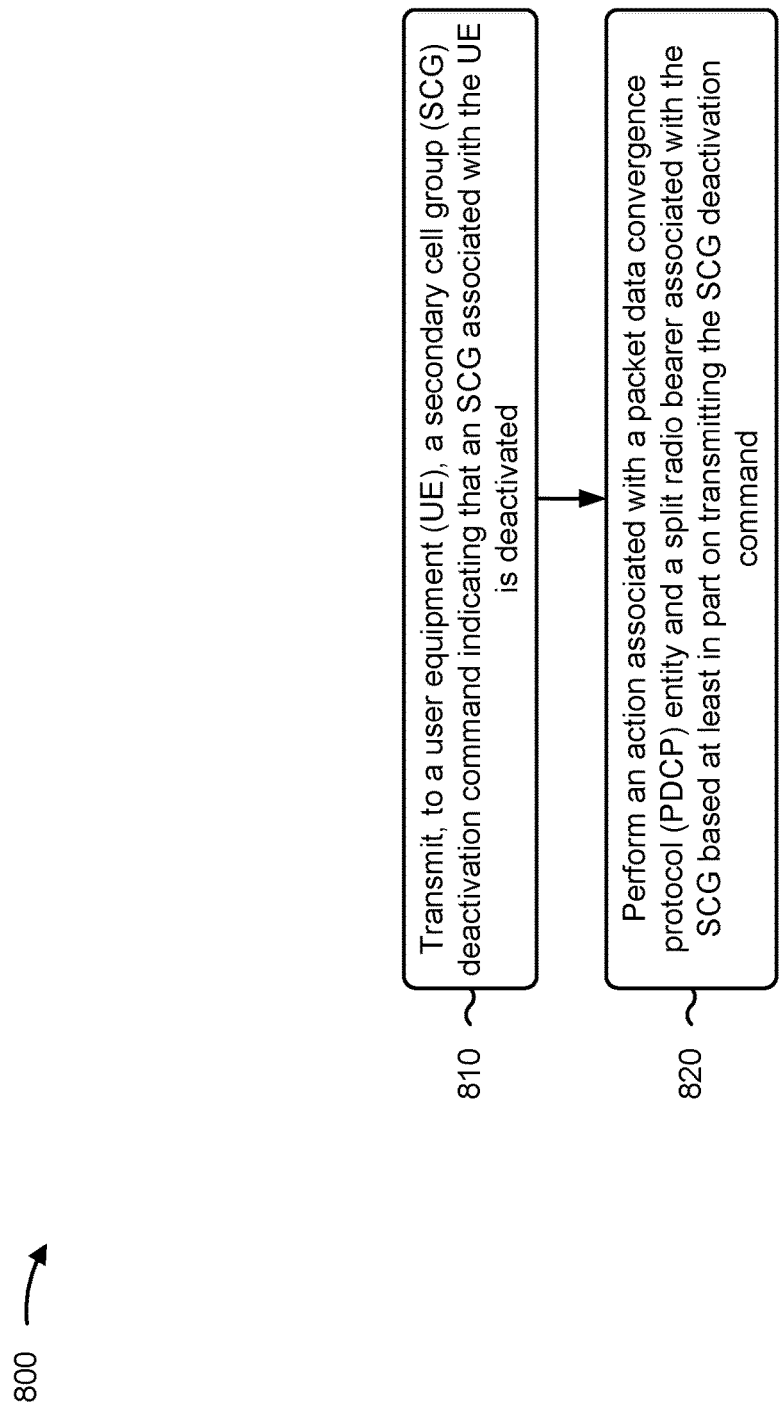

FIG. 8 is a diagram illustrating an example process 800 performed, for example, by a base station, in accordance with the present disclosure. Example process 800 is an example where the base station (e.g., base station 110) performs operations associated with PDCP handling SCG deactivation.

As shown in FIG. 8, in some aspects, process 800 may include transmitting, to a UE, an SCG deactivation command indicating that an SCG associated with the UE is deactivated (block 810). For example, the base station (e.g., using communication manager 150 and/or transmission component 1004, depicted in FIG. 10) may transmit, to a UE, an SCG deactivation command indicating that an SCG associated with the UE is deactivated, as described above.

As further shown in FIG. 8, in some aspects, process 800 may include performing an action associated with a PDCP entity and a split radio bearer associated with the SCG based at least in part on transmitting the SCG deactivation command (block 820). For example, the base station (e.g., using communication manager 150 and/or PDCP SCG deactivation handling component 1008, depicted in FIG. 10) may perform an action associated with a PDCP entity and a split radio bearer associated with the SCG based at least in part on transmitting the SCG deactivation command, as described above.

Process 800 may include additional aspects, such as any single aspect or any combination of aspects described below and/or in connection with one or more other processes described elsewhere herein.

With respect to process 800, in a first aspect, performing the action includes transmitting, via the PDCP entity, data associated with the split radio bearer on an MCG regardless of one or more conditions for selecting a cell group to be associated with the split radio bearer.

With respect to process 800, in a second aspect, alone or in combination with the first aspect, the one or more conditions include at least one of a threshold associated with a size of the data, or a primary path associated with the split radio bearer.

With respect to process 800, in a third aspect, alone or in combination with one or more of the first and second aspects, performing the action includes transmitting one or more PDUs, that are associated with a first RLC entity that is associated with the SCG, via a second RLC entity that is associated with an MCG.

With respect to process 800, in a fourth aspect, alone or in combination with one or more of the first through third aspects, the one or more PDUs were provided to the first RLC entity via the PDCP entity, and wherein the one or more PDUs have not been transmitted via the first RLC entity, and transmitting the one or more PDUs includes transmitting, to the UE, the one or more PDUs, that have not been transmitted via the first RLC entity, via the second RLC entity and the MCG.

With respect to process 800, in a fifth aspect, alone or in combination with one or more of the first through fourth aspects, the one or more PDUs were provided to the first RLC entity via the PDCP entity, and wherein the one or more PDUs have been transmitted via the first RLC entity and the SCG and have not been acknowledged via the UE, and transmitting the one or more PDUs includes transmitting, to the UE, the one or more PDUs, that have been transmitted via the first RLC entity and the SCG and have not been acknowledged via the UE, via the second RLC entity and the MCG.

With respect to process 800, in a sixth aspect, alone or in combination with one or more of the first through fifth aspects, performing the action includes providing, from an MAC entity or an RRC entity to the PDCP entity, an indication that the SCG is deactivated based at least in part on transmitting the SCG deactivation command.

With respect to process 800, in a seventh aspect, alone or in combination with one or more of the first through sixth aspects, process 800 includes refraining, via the PDCP entity, from providing PDUs associated with the split radio bearer to an RLC entity associated with the SCG based at least in part on receiving the indication that the SCG is deactivated from the MAC entity or the RRC entity.

With respect to process 800, in an eighth aspect, alone or in combination with one or more of the first through seventh aspects, process 800 includes providing, via the PDCP entity, PDUs associated with the split radio bearer to an RLC entity associated with an MCG regardless of one or more conditions for selecting a cell group to be associated with the split radio bearer based at least in part on receiving the indication that the SCG is deactivated from the MAC entity or the RRC entity.

With respect to process 800, in a ninth aspect, alone or in combination with one or more of the first through eighth aspects, performing the action includes modifying, via the PDCP entity, an amount of time for a timer associated with a buffering window for reordering packets associated with the split radio bearer received via the PDCP entity based at least in part on the SCG being deactivated.

With respect to process 800, in a tenth aspect, alone or in combination with one or more of the first through ninth aspects, process 800 includes receiving, via the PDCP entity, one or more packets, wherein each packet of the one or more packets is associated with the split radio bearer and the SCG, and modifying the amount of time for the timer includes reducing the amount of time to zero based at least in part on each packet of the one or more packets being associated with the SCG, and providing, from the PDCP entity to another logical entity associated with the base station, the one or more packets based at least in part on reducing the amount of time to zero.

With respect to process 800, in an eleventh aspect, alone or in combination with one or more of the first through tenth aspects, modifying the amount of time for the timer includes reducing the amount of time associated with the timer.

With respect to process 800, in a twelfth aspect, alone or in combination with one or more of the first through eleventh aspects, process 800 includes receiving, via the PDCP entity, one or more packets, wherein at least one packet, of the one or more packets, is associated with the SCG and at least one packet, of the one or more packets, is associated with an MCG, and modifying the amount of time for the timer includes reducing the amount of time to a value greater than zero.

With respect to process 800, in a thirteenth aspect, alone or in combination with one or more of the first through twelfth aspects, the timer is a t-reordering timer.

With respect to process 800, in a fourteenth aspect, alone or in combination with one or more of the first through thirteenth aspects, process 800 includes receiving, via the PDCP entity, one or more packets, wherein each packet of the one or more packets is associated with the split radio bearer and the SCG, and performing the action includes providing, via the PDCP entity and to another logical entity associated with the base station, the one or more packets based at least in part on an expiration of a timer associated with a buffering window for reordering packets associated with the split radio bearer received via the PDCP entity.

With respect to process 800, in a fifteenth aspect, alone or in combination with one or more of the first through fourteenth aspects, process 800 includes receiving, from the UE, a buffer status report associated with the radio bearer and the SCG based at least in part on receiving the data to be transmitted via the radio bearer associated with the SCG.

With respect to process 800, in a sixteenth aspect, alone or in combination with one or more of the first through fifteenth aspects, the buffer status report is a first buffer status report, and wherein receiving the buffer status report associated with the radio bearer and the SCG includes receiving, from the UE, a message, via an MCG radio bearer, wherein the message includes the first buffer status report and a second buffer status report associated with the MCG.

With respect to process 800, in a seventeenth aspect, alone or in combination with one or more of the first through sixteenth aspects, the message includes an indication that the message includes the buffer status report associated with the radio bearer and the SCG.

With respect to process 800, in an eighteenth aspect, alone or in combination with one or more of the first through seventeenth aspects, the message is a medium access control message.

With respect to process 800, in a nineteenth aspect, alone or in combination with one or more of the first through eighteenth aspects, receiving the buffer status report associated with the radio bearer and the SCG includes receiving, from the UE, an RRC message indicating that the data that is associated with the SCG has arrived at the UE.

With respect to process 800, in a twentieth aspect, alone or in combination with one or more of the first through nineteenth aspects, the RRC message is a UE assistance information message.

With respect to process 800, in a twenty-first aspect, alone or in combination with one or more of the first through twentieth aspects, performing the action includes transmitting, to the UE, a message to reconfigure the radio bearer to be associated with an MCG or to activate the SCG based at least in part on receiving the buffer status report associated with the radio bearer and the SCG or based at least in part on receiving an RRC message indicating that the data that is associated with the SCG has arrived at the UE.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
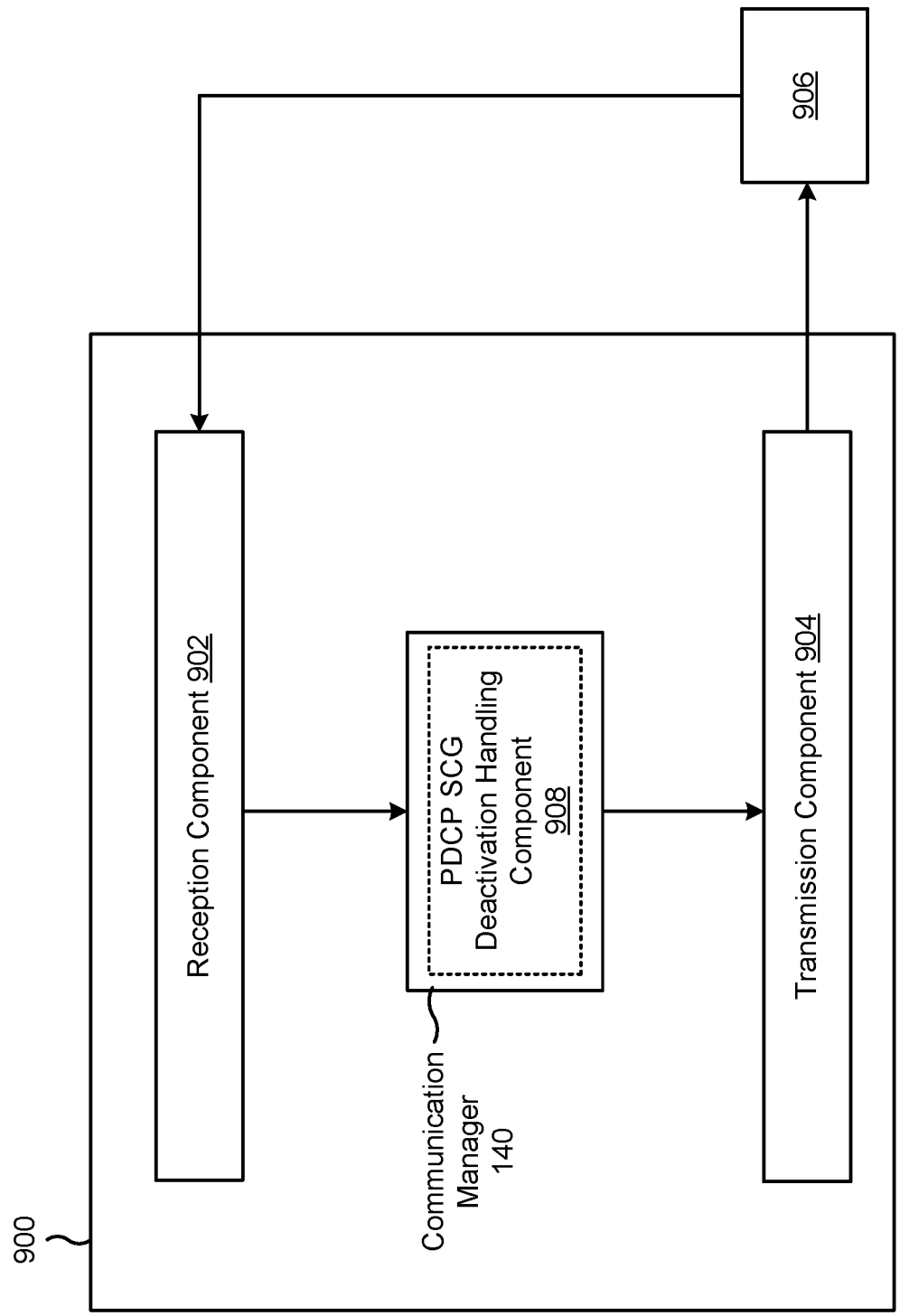

FIG. 9 is a diagram of an example apparatus 900 for wireless communication. The apparatus 900 may be a UE, or a UE may include the apparatus 900. In some aspects, the apparatus 900 includes a reception component 902 and a transmission component 904, which may be in communication with one another (for example, via one or more buses and/or one or more other components). As shown, the apparatus 900 may communicate with another apparatus 906 (such as a UE, a base station, or another wireless communication device) using the reception component 902 and the transmission component 904. As further shown, the apparatus 900 may include the communication manager 140. The communication manager 140 may include a PDCP SCG deactivation handling component 908, among other examples.

In some aspects, the apparatus 900 may be configured to perform one or more operations described herein in connection with FIGS. 6A and 6B. Additionally, or alternatively, the apparatus 900 may be configured to perform one or more processes described herein, such as process 700 of FIG. 7, or a combination thereof. In some aspects, the apparatus 900 and/or one or more components shown in FIG. 9 may include one or more components of the UE described in connection with FIG. 2. Additionally, or alternatively, one or more components shown in FIG. 9 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 902 may receive communications, such as reference signals, control information, data communications, or a combination thereof, from the apparatus 906. The reception component 902 may provide received communications to one or more other components of the apparatus 900. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 900. In some aspects, the reception component 902 may include one or more antennas, a modem, a demodulator, a MIMO detector, a receive processor, a controller/processor, a memory, or a combination thereof, of the UE described in connection with FIG. 2.

The transmission component 904 may transmit communications, such as reference signals, control information, data communications, or a combination thereof, to the apparatus 906. In some aspects, one or more other components of the apparatus 900 may generate communications and may provide the generated communications to the transmission component 904 for transmission to the apparatus 906. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 906. In some aspects, the transmission component 904 may include one or more antennas, a modem, a modulator, a transmit MIMO processor, a transmit processor, a controller/processor, a memory, or a combination thereof, of the UE described in connection with FIG. 2. In some aspects, the transmission component 904 may be co-located with the reception component 902 in a transceiver.

The reception component 902 may receive, from a base station, an SCG deactivation command indicating that an SCG associated with the apparatus 900 is deactivated. The PDCP SCG deactivation handling component 908 may perform an action associated with a PDCP entity and a split radio bearer associated with the SCG based at least in part on receiving the SCG deactivation command.

The PDCP SCG deactivation handling component 908 may refrain, via the PDCP entity, from providing PDUs associated with the split radio bearer to an RLC entity associated with the SCG based at least in part on receiving the indication that the SCG is deactivated from the MAC entity or the RRC entity.

The PDCP SCG deactivation handling component 908 may provide, via the PDCP entity, PDUs associated with the split radio bearer to an RLC entity associated with an MCG regardless of one or more conditions for selecting a cell group to be associated with the split radio bearer based at least in part on receiving the indication that the SCG is deactivated from the MAC entity or the RRC entity.

The reception component 902 may receive, via the PDCP entity, one or more packets, wherein each packet of the one or more packets is associated with the split radio bearer and the SCG. The PDCP SCG deactivation handling component 908 may reduce the amount of time, for a timer (e.g., a t-reordering timer) associated with a buffering window for reordering packets associated with the split radio bearer received via the PDCP entity, to zero based at least in part on each packet of the one or more packets being associated with the SCG. The PDCP SCG deactivation handling component 908 may provide, from the PDCP entity to another logical entity associated with the UE, the one or more packets based at least in part on reducing the amount of time to zero.

The reception component 902 may receive, via the PDCP entity, one or more packets, wherein at least one packet, of the one or more packets, is associated with the SCG and at least one packet, of the one or more packets, is associated with an MCG. The PDCP SCG deactivation handling component 908 may reduce the amount of time associated with the timer to a value greater than zero.

The reception component 902 may receive, via the PDCP entity, one or more packets, wherein each packet of the one or more packets is associated with the split radio bearer and the SCG. The PDCP SCG deactivation handling component 908 provide, via the PDCP entity and to another logical entity associated with the UE, the one or more packets based at least in part on an expiration of a timer associated with a buffering window for reordering packets associated with the split radio bearer received via the PDCP entity.

The reception component 902 may receive, via the PDCP entity, data to be transmitted via a radio bearer associated with the SCG after receiving the SCG deactivation command. The transmission component 904 may transmit, to the base station, a buffer status report associated with the radio bearer and the SCG based at least in part on receiving the data to be transmitted via the radio bearer associated with the SCG.

The reception component 902 may receive, from the base station, a message to reconfigure the radio bearer to be associated with an MCG or to activate the SCG based at least in part on transmitting the buffer status report associated with the radio bearer and the SCG.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally, or alternatively, a set of (one or more) components shown in FIG. 9 may perform one or more functions described as being performed by another set of components shown in FIG. 9.

FIG. 10 is a diagram of an example apparatus 1000 for wireless communication. The apparatus 1000 may be a base station, or a base station may include the apparatus 1000. In some aspects, the apparatus 1000 includes a reception component 1002 and a transmission component 1004, which may be in communication with one another (for example, via one or more buses and/or one or more other components). As shown, the apparatus 1000 may communicate with another apparatus 1006 (such as a UE, a base station, or another wireless communication device) using the reception component 1002 and the transmission component 1004. As further shown, the apparatus 1000 may include the communication manager 150. The communication manager 150 may include a PDCP SCG deactivation handling component 1008, among other examples.

In some aspects, the apparatus 1000 may be configured to perform one or more operations described herein in connection with FIGS. 6A and 6B. Additionally, or alternatively, the apparatus 1000 may be configured to perform one or more processes described herein, such as process 800 of FIG. 8, or a combination thereof. In some aspects, the apparatus 1000 and/or one or more components shown in FIG. 10 may include one or more components of the base station described in connection with FIG. 2. Additionally, or alternatively, one or more components shown in FIG. 10 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive communications, such as reference signals, control information, data communications, or a combination thereof, from the apparatus 1006. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1000. In some aspects, the reception component 1002 may include one or more antennas, a modem, a demodulator, a MIMO detector, a receive processor, a controller/processor, a memory, or a combination thereof, of the base station described in connection with FIG. 2.

The transmission component 1004 may transmit communications, such as reference signals, control information, data communications, or a combination thereof, to the apparatus 1006. In some aspects, one or more other components of the apparatus 1000 may generate communications and may provide the generated communications to the transmission component 1004 for transmission to the apparatus 1006. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1006. In some aspects, the transmission component 1004 may include one or more antennas, a modem, a modulator, a transmit MIMO processor, a transmit processor, a controller/processor, a memory, or a combination thereof, of the base station described in connection with FIG. 2. In some aspects, the transmission component 1004 may be co-located with the reception component 1002 in a transceiver.

The transmission component 1004 may transmit, to a UE, an SCG deactivation command indicating that an SCG associated with the UE is deactivated. The PDCP SCG deactivation handling component 1008 may perform an action associated with a PDCP entity and a split radio bearer associated with the SCG based at least in part on transmitting the SCG deactivation command.

The PDCP SCG deactivation handling component 1008 may refrain, via the PDCP entity, from providing PDUs associated with the split radio bearer to an RLC entity associated with the SCG based at least in part on receiving the indication that the SCG is deactivated from the MAC entity or the RRC entity.

The PDCP SCG deactivation handling component 1008 may provide, via the PDCP entity, PDUs associated with the split radio bearer to an RLC entity associated with an MCG regardless of one or more conditions for selecting a cell group to be associated with the split radio bearer based at least in part on receiving the indication that the SCG is deactivated from the MAC entity or the RRC entity.

The reception component 1002 may receive, via the PDCP entity, one or more packets, wherein each packet of the one or more packets is associated with the split radio bearer and the SCG. The PDCP SCG deactivation handling component 1008 may reduce an amount of time, for a timer associated with a buffering window for reordering packets associated with the split radio bearer received via the PDCP entity, to zero based at least in part on each packet of the one or more packets being associated with the SCG.

The reception component 1002 may receive, via the PDCP entity, one or more packets, wherein at least one packet, of the one or more packets, is associated with the SCG and at least one packet, of the one or more packets, is associated with an MCG. The PDCP SCG deactivation handling component 1008 may reduce the amount of time to a value greater than zero.

The reception component 1002 may receive, via the PDCP entity, one or more packets, wherein each packet of the one or more packets is associated with the split radio bearer and the SCG.

The reception component 1002 may receive, from the UE, a buffer status report associated with the radio bearer and the SCG based at least in part on receiving the data to be transmitted via the radio bearer associated with the SCG.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of (one or more) components shown in FIG. 10 may perform one or more functions described as being performed by another set of components shown in FIG. 10.

The following provides an overview of some Aspects of the present disclosure:

Aspect 1: A method of wireless communication performed by a user equipment (UE), comprising: receiving, from a base station, a secondary cell group (SCG) deactivation command indicating that an SCG associated with the UE is deactivated; and performing an action associated with a packet data convergence protocol (PDCP) entity and a split radio bearer associated with the SCG based at least in part on receiving the SCG deactivation command.

Aspect 2: The method of Aspect 1, wherein performing the action comprises: transmitting, via the PDCP entity, data associated with the split radio bearer on a master cell group (MCG) regardless of one or more conditions for selecting a cell group to be associated with the split radio bearer.

Aspect 3: The method of Aspect 2, wherein the one or more conditions include at least one of: a threshold associated with a size of the data, or a primary path associated with the split radio bearer.

Aspect 4: The method of any of Aspects 1-3, wherein performing the action comprises: transmitting one or more protocol data units (PDUs), that are associated with a first radio link control (RLC) entity that is associated with the SCG, via a second RLC entity that is associated with a master cell group (MCG).

Aspect 5: The method of Aspect 4, wherein the one or more PDUs were provided to the first RLC entity via the PDCP entity, and wherein the one or more PDUs have not been transmitted via the first RLC entity, and wherein transmitting the one or more PDUs comprises: transmitting, to the base station, the one or more PDUs, that have not been transmitted via the first RLC entity, via the second RLC entity and the MCG.

Aspect 6: The method of Aspect 4, wherein the one or more PDUs were provided to the first RLC entity via the PDCP entity, and wherein the one or more PDUs have been transmitted via the first RLC entity and the SCG and have not been acknowledged by the base station, and wherein transmitting the one or more PDUs comprises: transmitting, to the base station, the one or more PDUs that have been transmitted via the first RLC entity but have not been acknowledged by the base station, via the second RLC entity and the MCG.

Aspect 7: The method of any of Aspects 1-6, wherein performing the action comprises: providing, from a medium access control (MAC) entity or a radio resource control (RRC) entity to the PDCP entity, an indication that the SCG is deactivated based at least in part on receiving the SCG deactivation command.

Aspect 8: The method of Aspect 7, further comprising: refraining, via the PDCP entity, from providing protocol data units (PDUs) associated with the split radio bearer to a radio link control (RLC) entity associated with the SCG based at least in part on receiving the indication that the SCG is deactivated from the MAC entity or the RRC entity.

Aspect 9: The method of any of Aspects 7-8, further comprising: providing, via the PDCP entity, protocol data units (PDUs) associated with the split radio bearer to a radio link control (RLC) entity associated with a master cell group (MCG) regardless of one or more conditions for selecting a cell group to be associated with the split radio bearer based at least in part on receiving the indication that the SCG is deactivated from the MAC entity or the RRC entity.

Aspect 10: The method of any of Aspects 1-9, where performing the action comprises: modifying, via the PDCP entity, an amount of time for a timer associated with a buffering window for reordering packets associated with the split radio bearer received via the PDCP entity based at least in part on the SCG being deactivated.

Aspect 11: The method of Aspect 10, further comprising: receiving, via the PDCP entity, one or more packets, wherein each packet of the one or more packets is associated with the split radio bearer and the SCG; and wherein modifying the amount of time for the timer comprises: reducing the amount of time to zero based at least in part on each packet of the one or more packets being associated with the SCG; and providing, from the PDCP entity to another logical entity associated with the UE, the one or more packets based at least in part on reducing the amount of time to zero.

Aspect 12: The method of any of Aspects 10-11, wherein modifying the amount of time for the timer comprises: reducing the amount of time associated with the timer.

Aspect 13: The method of any of Aspects 10, further comprising: receiving, via the PDCP entity, one or more packets, wherein at least one packet, of the one or more packets, is associated with the SCG and at least one packet, of the one or more packets, is associated with a master cell group (MCG); and wherein modifying the amount of time for the timer comprises: reducing the amount of time to a value greater than zero.

Aspect 14: The method of any of Aspects 10-13, wherein the timer is a t-reordering timer.

Aspect 15: The method of any of Aspects 1-14, further comprising: receiving, via the PDCP entity, one or more packets, wherein each packet of the one or more packets is associated with the split radio bearer and the SCG; and wherein performing the action comprises: providing, via the PDCP entity and to another logical entity associated with the UE, the one or more packets based at least in part on an expiration of a timer associated with a buffering window for reordering packets associated with the split radio bearer received via the PDCP entity.

Aspect 16: The method of any of Aspects 1-15, further comprising: receiving, via the PDCP entity, data to be transmitted via a radio bearer associated with the SCG after receiving the SCG deactivation command; and wherein performing the action comprises: transmitting, to the base station, a buffer status report associated with the radio bearer and the SCG based at least in part on receiving the data to be transmitted via the radio bearer associated with the SCG.

Aspect 17: The method of Aspect 16, wherein the buffer status report is a first buffer status report, and wherein transmitting the buffer status report associated with the radio bearer and the SCG comprises: transmitting, to the base station, a message, via a master cell group (MCG) radio bearer, wherein the message includes the first buffer status report and a second buffer status report associated with the MCG.

Aspect 18: The method of Aspect 17, wherein the message includes an indication that the message includes the buffer status report associated with the radio bearer and the SCG.

Aspect 19: The method of any of Aspects 17-18, wherein the message is a medium access control message.

Aspect 20: The method of Aspect 16, wherein transmitting the buffer status report associated with the radio bearer and the SCG comprises: transmitting, to the base station, a radio resource control (RRC) message indicating that the data that is associated with the SCG has arrived at the UE.

Aspect 21: The method of Aspect 20, wherein the RRC message is a UE assistance information message.

Aspect 22: The method of any of Aspects 16-21, further comprising: receiving, from the base station, a message to reconfigure the radio bearer to be associated with a master cell group (MCG) or to activate the SCG based at least in part on transmitting the buffer status report associated with the radio bearer and the SCG or based at least in part on transmitting a radio resource control (RRC) message indicating that the data that is associated with the SCG has arrived at the UE.

Aspect 23: A method of wireless communication performed by a base station, comprising: transmitting, to a user equipment (UE), a secondary cell group (SCG) deactivation command indicating that an SCG associated with the UE is deactivated; and performing an action associated with a packet data convergence protocol (PDCP) entity and a split radio bearer associated with the SCG based at least in part on transmitting the SCG deactivation command.

Aspect 24: The method of Aspect 23, wherein performing the action comprises: transmitting, via the PDCP entity, data associated with the split radio bearer on a master cell group (MCG) regardless of one or more conditions for selecting a cell group to be associated with the split radio bearer.

Aspect 25: The method of Aspect 24, wherein the one or more conditions include at least one of: a threshold associated with a size of the data, or a primary path associated with the split radio bearer.

Aspect 26: The method of any of Aspects 23-25, wherein performing the action comprises: transmitting one or more protocol data units (PDUs), that are associated with a first radio link control (RLC) entity that is associated with the SCG, via a second RLC entity that is associated with a master cell group (MCG).

Aspect 27: The method of Aspect 26, wherein the one or more PDUs were provided to the first RLC entity via the PDCP entity, and wherein the one or more PDUs have not been transmitted via the first RLC entity, and wherein transmitting the one or more PDUs comprises: transmitting, to the UE, the one or more PDUs, that have not been transmitted via the first RLC entity, via the second RLC entity and the MCG.

Aspect 28: The method of Aspect 26, wherein the one or more PDUs were provided to the first RLC entity via the PDCP entity, and wherein the one or more PDUs have been transmitted via the first RLC entity and the SCG and have not been acknowledged by the UE, and wherein transmitting the one or more PDUs comprises: transmitting, to the UE, the one or more PDUs, that have been transmitted via the first RLC entity and the SCG and have not been acknowledged by the UE, via the second RLC entity and the MCG.

Aspect 29: The method of any of Aspects 23-28, wherein performing the action comprises: providing, from a medium access control (MAC) entity or a radio resource control (RRC) entity to the PDCP entity, an indication that the SCG is deactivated based at least in part on transmitting the SCG deactivation command.

Aspect 30: The method of Aspect 29, further comprising: refraining, via the PDCP entity, from providing protocol data units (PDUs) associated with the split radio bearer to a radio link control (RLC) entity associated with the SCG based at least in part on receiving the indication that the SCG is deactivated from the MAC entity or the RRC entity.

Aspect 31: The method of any of Aspects 29-30, further comprising: providing, via the PDCP entity, protocol data units (PDUs) associated with the split radio bearer to a radio link control (RLC) entity associated with a master cell group (MCG) regardless of one or more conditions for selecting a cell group to be associated with the split radio bearer based at least in part on receiving the indication that the SCG is deactivated from the MAC entity or the RRC entity.

Aspect 32: The method of any of Aspects 23-31, where performing the action comprises: modifying, via the PDCP entity, an amount of time for a timer associated with a buffering window for reordering packets associated with the split radio bearer received via the PDCP entity based at least in part on the SCG being deactivated.

Aspect 33: The method of Aspect 32, further comprising: receiving, via the PDCP entity, one or more packets, wherein each packet of the one or more packets is associated with the split radio bearer and the SCG; and wherein modifying the amount of time for the timer comprises: reducing the amount of time to zero based at least in part on each packet of the one or more packets being associated with the SCG; and providing, from the PDCP entity to another logical entity associated with the base station, the one or more packets based at least in part on reducing the amount of time to zero.

Aspect 34: The method of any of Aspects 32-33, wherein modifying the amount of time for the timer comprises: reducing the amount of time associated with the timer.

Aspect 35: The method of Aspect 32, further comprising: receiving, via the PDCP entity, one or more packets, wherein at least one packet, of the one or more packets, is associated with the SCG and at least one packet, of the one or more packets, is associated with a master cell group (MCG); and wherein modifying the amount of time for the timer comprises: reducing the amount of time to a value greater than zero, wherein modifying the amount of time for the timer comprises: reducing the amount of time to a value greater than zero.

Aspect 36: The method of any of Aspects 32-35, wherein the timer is a t-reordering timer.

Aspect 37: The method of any of Aspects 23-36, further comprising: receiving, via the PDCP entity, one or more packets, wherein each packet of the one or more packets is associated with the split radio bearer and the SCG; and wherein performing the action comprises: providing, via the PDCP entity and to another logical entity associated with the base station, the one or more packets based at least in part on an expiration of a timer associated with a buffering window for reordering packets associated with the split radio bearer received via the PDCP entity.

Aspect 38: The method of any of Aspects 23-37, further comprising: receiving, from the UE, a buffer status report associated with the radio bearer and the SCG based at least in part on receiving the data to be transmitted via the radio bearer associated with the SCG.

Aspect 39: The method of Aspect 38, wherein the buffer status report is a first buffer status report, and wherein receiving the buffer status report associated with the radio bearer and the SCG comprises: receiving, from the UE, a message, via a master cell group (MCG) radio bearer, wherein the message includes the first buffer status report and a second buffer status report associated with the MCG.

Aspect 40: The method of Aspect 39, wherein the message includes an indication that the message includes the buffer status report associated with the radio bearer and the SCG.

Aspect 41: The method of any of Aspects 39-40, wherein the message is a medium access control message.

Aspect 42: The method of Aspect 38, wherein receiving the buffer status report associated with the radio bearer and the SCG comprises: receiving, from the UE, a radio resource control (RRC) message indicating that the data that is associated with the SCG has arrived at the UE.

Aspect 43: The method of Aspect 42, wherein the RRC message is a UE assistance information message.

Aspect 44: The method of any of Aspects 38-43, wherein performing the action comprises: transmitting, to the UE, a message to reconfigure the radio bearer to be associated with a master cell group (MCG) or to activate the SCG based at least in part on receiving the buffer status report associated with the radio bearer and the SCG or based at least in part on receiving a radio resource control (RRC) message indicating that the data that is associated with the SCG has arrived at the UE.

Aspect 45: An apparatus for wireless communication at a device, comprising a processor; memory coupled with the processor; and instructions stored in the memory and executable by the processor to cause the apparatus to perform the method of one or more of Aspects 1-22.

Aspect 46: A device for wireless communication, comprising a memory and one or more processors coupled to the memory, the one or more processors configured to perform the method of one or more of Aspects 1-22.

Aspect 47: An apparatus for wireless communication, comprising at least one means for performing the method of one or more of Aspects 1-22.

Aspect 48: A non-transitory computer-readable medium storing code for wireless communication, the code comprising instructions executable by a processor to perform the method of one or more of Aspects 1-22.

Aspect 49: A non-transitory computer-readable medium storing a set of instructions for wireless communication, the set of instructions comprising one or more instructions that, when executed by one or more processors of a device, cause the device to perform the method of one or more of Aspects 1-22.

Aspect 50: An apparatus for wireless communication at a device, comprising a processor; memory coupled with the processor; and instructions stored in the memory and executable by the processor to cause the apparatus to perform the method of one or more of Aspects 23-44.

Aspect 51: A device for wireless communication, comprising a memory and one or more processors coupled to the memory, the one or more processors configured to perform the method of one or more of Aspects 23-44.

Aspect 52: An apparatus for wireless communication, comprising at least one means for performing the method of one or more of Aspects 23-44.

Aspect 53: A non-transitory computer-readable medium storing code for wireless communication, the code comprising instructions executable by a processor to perform the method of one or more of Aspects 23-44.

Aspect 54: A non-transitory computer-readable medium storing a set of instructions for wireless communication, the set of instructions comprising one or more instructions that, when executed by one or more processors of a device, cause the device to perform the method of one or more of Aspects 23-44.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An apparatus for wireless communication at a user equipment (UE), comprising:
   memory; and
   one or more processors, coupled to the memory, configured to:
      receive a secondary cell group (SCG) deactivation command indicating that an SCG associated with the UE is deactivated; and
      perform an action associated with a packet data convergence protocol (PDCP) entity and a split radio bearer associated with the SCG based at least in part on receiving the SCG deactivation command, wherein the action includes refraining from reconfiguration of the split radio bearer, ignoring an uplink data split threshold for selecting a cell group to be associated with the split radio bearer before transmitting data associated with the split radio bearer on a master cell group (MCG), and one of:
         providing an indication of deactivation of the SCG to the PDCP entity,
         providing, from the PDCP entity, one or more PDCP packet data units (PDUs) to an upper layer of the UE,
         providing, from the PDCP entity, an indication that particular data associated with the SCG has arrived, or
         refraining from providing one or more PDCP PDUs from the PDCP entity to an upper layer of the UE.

2. The apparatus of claim 1,
   wherein the action includes providing, from the PDCP entity, the one or more PDCP PDUs to an entity associated with the MCG, and wherein the one or more processors, to perform the action, are configured to:
      transmit, via the PDCP entity, data associated with the split radio bearer on the MCG regardless of the uplink data split threshold associated with the split radio bearer.

3. The apparatus of claim 1,
   wherein the one or more processors, to perform the action, are configured to:
      transmit the one or more PDCP PDUs, that are associated with a first radio link control (RLC) entity that is associated with the SCG, via a second RLC entity that is associated with the MCG.

4. The apparatus of claim 3,
   wherein the one or more PDCP PDUs were provided to the first RLC entity via the PDCP entity, and wherein the one or more PDCP PDUs have not been transmitted via the first RLC entity, and wherein the one or more processors, to transmit the one or more PDCP PDUs, are configured to:
  transmit, to a base station, the one or more PDCP PDUs, that have not been transmitted via the first RLC entity, via the second RLC entity and the MCG.

5. The apparatus of claim 3, wherein the one or more PDCP PDUs were provided to the first RLC entity via the PDCP entity, and wherein the one or more PDCP PDUs have been transmitted via the first RLC entity and the SCG and have not been acknowledged by a base station, and wherein the one or more processors, to transmit the one or more PDCP PDUs, are configured to:
  transmit, to the base station, the one or more PDCP PDUs that have been transmitted via the first RLC entity but have not been acknowledged by the base station, via the second RLC entity and the MCG.

6. The apparatus of claim 1, wherein the action includes providing the indication of deactivation of the SCG to the PDCP entity, and wherein the one or more processors, to perform the action, are configured to:
  provide, to the PDCP entity and from a medium access control (MAC) entity or from a radio resource control (RRC) entity, the indication of deactivation of the SCG based at least in part on receiving the SCG deactivation command.

7. The apparatus of claim 1, wherein the action includes refraining from providing the one or more PDCP PDUs from the PDCP entity to the upper layer of the UE, and wherein the one or more processors, to perform the action, are configured to:
  refrain, via the PDCP entity, from providing the one or more PDCP PDUs associated with the split radio bearer to a radio link control (RLC) entity associated with the SCG based at least in part on the PDCP entity receiving the indication that the SCG is deactivated.

8. The apparatus of claim 1, wherein the action includes modifying an amount of time for a timer associated with the PDCP entity, wherein the one or more processors, to perform the action, are configured to:
  modify, via the PDCP entity and based at least in part on the SCG being deactivated, the amount of time for the timer, and
  wherein the timer is associated with a buffering window for reordering packets associated with the split radio bearer received via the PDCP entity.

9. The apparatus of claim 8, wherein the one or more processors, to modify the amount of time for the timer, are configured to:
  reduce the amount of time associated with the timer.

10. The apparatus of claim 1, wherein the action includes providing from the PDCP entity, the one or more PDCP PDUs to the upper layer of the UE, and
wherein the one or more processors, to perform the action, are configured to:
  provide the one or more PDUs based at least in part on an expiration of a timer associated with a buffering window for reordering packets associated with the split radio bearer received via the PDCP entity.

11. The apparatus of claim 1, wherein the action includes providing the indication of deactivation of the SCG to the PDCP entity, wherein the one or more processors, to perform the action, are further configured to:
  receive, via the PDCP entity, data to be transmitted via a radio bearer associated with the SCG, and
  wherein the one or more processors are further configured to:
    transmit, to a base station, a buffer status report associated with the radio bearer and the SCG based at least in part on receiving the data to be transmitted via the radio bearer associated with the SCG.

12. The apparatus of claim 11, wherein the buffer status report is a first buffer status report, and wherein the one or more processors, to transmit the buffer status report associated with the radio bearer and the SCG, are configured to:
  transmit, to the base station, a message, via the MCG radio bearer, wherein the message includes the first buffer status report and a second buffer status report associated with the MCG.

13. The apparatus of claim 11, wherein the one or more processors, to transmit the buffer status report associated with the radio bearer and the SCG, are configured to:
  transmit, to the base station, a radio resource control (RRC) message indicating that the data that is associated with the SCG has arrived at the UE.

14. The apparatus of claim 11, wherein the one or more processors are further configured to:
  receive, from the base station, a message to reconfigure the radio bearer to be associated with the MCG or to activate the SCG based at least in part on transmitting the buffer status report associated with the radio bearer and the SCG or based at least in part on transmitting a radio resource control (RRC) message indicating that the data that is associated with the SCG has arrived at the UE.

15. A method of wireless communication performed by a user equipment (UE), comprising:
  receiving a secondary cell group (SCG) deactivation command indicating that an SCG associated with the UE is deactivated; and
  performing an action associated with a packet data convergence protocol (PDCP) entity and a split radio bearer associated with the SCG based at least in part on receiving the SCG deactivation command, wherein the action includes refraining from reconfiguration of the split radio bearer, ignoring an uplink data split threshold for selecting a cell group to be associated with the split radio bearer before transmitting data associated with the split radio bearer on a master cell group (MCG), and one of:
    providing an indication of deactivation of the SCG to the PDCP entity,
    providing, from the PDCP entity, one or more PDCP packet data units (PDUs) to an upper layer of the UE,
    providing, from the PDCP entity, an indication that particular data associated with the SCG has arrived, or
    refraining from providing one or more PDCP PDUs from the PDCP entity to an upper layer of the UE.

16. The method of claim 15,
wherein the action includes providing, from the PDCP entity, the one or more PDCP PDUs to an entity associated with the MCG, and wherein performing the action comprises:
transmitting, via the PDCP entity, data associated with the split radio bearer on the MCG regardless of the uplink data split threshold associated with the split radio bearer.

17. The method of claim 15,
wherein performing the action comprises:
transmitting the one or more PDCP PDUs, that are associated with a first radio link control (RLC) entity that is associated with the SCG, via a second RLC entity that is associated with the MCG.

18. The method of claim 17,
wherein the one or more PDCP PDUs were provided to the first RLC entity via the PDCP entity, and wherein the one or more PDCP PDUs have not been transmitted via the first RLC entity, and wherein transmitting the one or more PDCP PDUs comprises:
transmitting, to a base station, the one or more PDCP PDUs, that have not been transmitted via the first RLC entity, via the second RLC entity and the MCG.

19. The method of claim 17,
wherein the one or more PDCP PDUs were provided to the first RLC entity via the PDCP entity, and wherein the one or more PDCP PDUs have been transmitted via the first RLC entity and the SCG and have not been acknowledged by a base station, and wherein transmitting the one or more PDCP PDUs comprises:
transmitting, to the base station, the one or more PDCP PDUs that have been transmitted via the first RLC entity but have not been acknowledged by the base station, via the second RLC entity and the MCG.

20. The method of claim 15,
wherein the action includes providing the indication of deactivation of the SCG to the PDCP entity, and wherein performing the action comprises:
providing, to the PDCP entity and from a medium access control (MAC) entity or from a radio resource control (RRC) entity, the indication of deactivation of the SCG based at least in part on receiving the SCG deactivation command.

21. The method of claim 15,
wherein the action includes refraining from providing the one or more PDCP PDUs from the PDCP entity to the upper layer of the UE, and wherein performing the action comprises:
refraining, via the PDCP entity, from providing the one or more PDCP PDUs associated with the split radio bearer to a radio link control (RLC) entity associated with the SCG based at least in part on the PDCP entity receiving the indication that the SCG is deactivated.

22. The method of claim 15,
wherein the action includes modifying an amount of time for a timer associated with the PDCP entity, wherein performing the action comprises:
modifying, via the PDCP entity and based at least in part on the SCG being deactivated, the amount of time for the timer, and
wherein the timer is associated with a buffering window for reordering packets associated with the split radio bearer received via the PDCP entity based at least in part on the SCG being deactivated.

23. The method of claim 22,
wherein modifying the amount of time for the timer comprises:
reducing the amount of time associated with the timer.

24. The method of claim 15,
wherein the action includes providing from the PDCP entity, the one or more PDCP PDUs to the upper layer of the UE, and wherein performing the action comprises:
providing the one or more PDUs based at least in part on an expiration of a timer associated with a buffering window for reordering packets associated with the split radio bearer received via the PDCP entity.

25. The method of claim 15,
wherein the action includes providing the indication of deactivation of the SCG to the PDCP entity, wherein performing the action comprises:
receiving, via the PDCP entity, data to be transmitted via a radio bearer associated with the SCG; and
wherein the method further comprises:
transmitting, to a base station, a buffer status report associated with the radio bearer and the SCG based at least in part on receiving the data to be transmitted via the radio bearer associated with the SCG.

26. The method of claim 25,
wherein the buffer status report is a first buffer status report, and wherein transmitting the buffer status report associated with the radio bearer and the SCG comprises:
transmitting, to the base station, a message, via the MCG radio bearer, wherein the message includes the first buffer status report and a second buffer status report associated with the MCG.

27. The method of claim 25,
wherein transmitting the buffer status report associated with the radio bearer and the SCG comprises:
transmitting, to the base station, a radio resource control (RRC) message indicating that the data that is associated with the SCG has arrived at the UE.

28. The method of claim 25, further comprising:
receiving, from the base station, a message to reconfigure the radio bearer to be associated with the MCG or to activate the SCG based at least in part on transmitting the buffer status report associated with the radio bearer and the SCG or based at least in part on transmitting a radio resource control (RRC) message indicating that the data that is associated with the SCG has arrived at the UE.

29. A non-transitory computer-readable medium storing a set of instructions for wireless communication, the set of instructions comprising:
one or more instructions that, when executed by one or more processors of a user equipment (UE), cause the UE to:
receive a secondary cell group (SCG) deactivation command indicating that an SCG associated with the UE is deactivated; and
perform an action associated with a packet data convergence protocol (PDCP) entity and a split radio bearer associated with the SCG based at least in part on receiving the SCG deactivation command, wherein the action includes refraining from reconfiguration of the split radio bearer, ignoring an uplink data split threshold for selecting a cell group to be associated with the split radio bearer before transmitting data associated with the split radio bearer on a master cell group (MCG), and one of:

providing an indication of deactivation of the SCG to the PDCP entity, providing, from the PDCP entity, one or more PDCP packet data units (PDUs) to an upper layer of the UE, providing, from the PDCP entity, an indication that particular data associated with the SCG has arrived, or refraining from providing one or more PDCP PDUs from the PDCP entity to an upper layer of the UE.

30. An apparatus for wireless communication, comprising:

means for receiving a secondary cell group (SCG) deactivation command indicating that an SCG associated with the apparatus is deactivated; and means for performing an action associated with a packet data convergence protocol (PDCP) entity and a split radio bearer associated with the SCG based at least in part on receiving the SCG deactivation command, wherein the action includes refraining from reconfiguration of the split radio bearer, ignoring an uplink data split threshold for selecting a cell group to be associated with the split radio bearer before transmitting data associated with the split radio bearer on a master cell group (MCG), and one of:

providing an indication of deactivation of the SCG to the PDCP entity, providing, from the PDCP entity, one or more PDCP packet data units (PDUs) to an upper layer of the apparatus, providing, from the PDCP entity, an indication that particular data associated with the SCG has arrived, or refraining from providing one or more PDCP PDUs from the PDCP entity to an upper layer of the apparatus.

* * * * *